(12) United States Patent
Shen et al.

(10) Patent No.: US 12,407,745 B2
(45) Date of Patent: Sep. 2, 2025

(54) CONTENT PARTITION BASED REAL TIME COMMUNICATION FOR IMMERSIVE MEDIA

(71) Applicant: Intel Corporation, Santa Clara, CA (US)

(72) Inventors: Gang Shen, Hillsboro, OR (US); Hassnaa Moustafa, San Jose, CA (US); Jianhui Dai, Shanghai (CN); Qiujiao Wu, Shanghai (CN); Jianlin Qiu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/575,161

(22) PCT Filed: Dec. 23, 2021

(86) PCT No.: PCT/US2021/065071
§ 371 (c)(1),
(2) Date: Dec. 28, 2023

(87) PCT Pub. No.: WO2023/086112
PCT Pub. Date: May 19, 2023

(65) Prior Publication Data
US 2024/0297910 A1  Sep. 5, 2024

(30) Foreign Application Priority Data

Nov. 10, 2021 (WO) ................ PCT/CN2021/129723

(51) Int. Cl.
*H04L 65/65* (2022.01)
*H04L 65/1069* (2022.01)
(Continued)

(52) U.S. Cl.
CPC .......... *H04L 65/65* (2022.05); *H04L 65/1069* (2013.01); *H04N 21/6437* (2013.01); *H04N 21/845* (2013.01)

(58) Field of Classification Search
CPC . H04L 65/65; H04L 65/1069; H04N 21/6437; H04N 21/845
(Continued)

(56) References Cited

U.S. PATENT DOCUMENTS

2019/0104326 A1  4/2019  Stockhammer et al.
2019/0141373 A1* 5/2019  van Deventer .. H04N 21/85406
(Continued)

FOREIGN PATENT DOCUMENTS

CN      117581550       2/2024
DE      112021008438    8/2024
WO      WO-2020023175 A1  1/2020

OTHER PUBLICATIONS

"International Application Serial No. PCT US2021 065071, International Preliminary Report on Patentability mailed May 23, 2024", 6 pgs.

(Continued)

*Primary Examiner* — Glenford J Madamba
(74) *Attorney, Agent, or Firm* — Schwegman Lundberg & Woessner, P.A.

(57) ABSTRACT

Systems and techniques for selective transport of spatially partitioned immersive media content are described herein. In an example, the system may negotiate an attribute for media content between a media producer and a media consumer. A content structure for the media content may be determined based on the negotiation of the attribute, and a network packet may be created with information corresponding to the determined content structure encoded into a transport protocol header of the network packet. The network packet may (Continued)

be filtered to produce filtered media content. The filtered media content may be transmitted to the media consumer.

20 Claims, 20 Drawing Sheets

(51) Int. Cl.
*H04N 21/6437* (2011.01)
*H04N 21/845* (2011.01)

(58) Field of Classification Search
USPC .......................................................... 709/231
See application file for complete search history.

(56) References Cited

U.S. PATENT DOCUMENTS

| 2020/0035024 | A1* | 1/2020 | Price ..................... G06T 19/006 |
| 2020/0177941 | A1 | 6/2020 | El Essaili et al. |
| 2021/0160552 | A1* | 5/2021 | Fang .................... H04N 21/435 |

OTHER PUBLICATIONS

"International Application Serial No. PCT/US2021/065071, International Search Report mailed Aug. 4, 2022", 3 pgs.
"International Application Serial No. PCT/US2021/065071, Written Opinion mailed Aug. 4, 2022", 4 pgs.

* cited by examiner

FIG. 12

CONTENT PARTITION BASED REAL TIME COMMUNICATION FOR IMMERSIVE MEDIA

PRIORITY

This application is a U.S. National Stage Application under 35 U.S.C. 371 from International Application No. PCT/US2021/065071, filed Dec. 23, 2021, published as WO 2023/086112, which claims the benefit of priority of International Application No. PCT/CN2021/129723, filed on Nov. 10, 2021, entitled "CONTENT PARTITION BASED REAL TIME COMMUNICATION FOR IMMERSIVE MEDIA," all of which are claimed incorporated herein by reference in their entirety.

TECHNICAL FIELD

The present disclosure relates to the field of immersive media streaming.

BACKGROUND

Immersive media (e.g., Virtual Reality (VR), Augmented Reality (AR), Mixed Reality (MR)/(XR), or the like) streaming contains a large volume of two-dimensional and three-dimensional content and demands ultra-high bandwidth with constant interactivity between a client device and a server. A common request is to selectively transport and deliver partial contents (e.g., in a spatial domain), such as a region of interest of media to a device.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 12 illustrates an example of content partitioning of media content.

DETAILED DESCRIPTION

Figure 1:
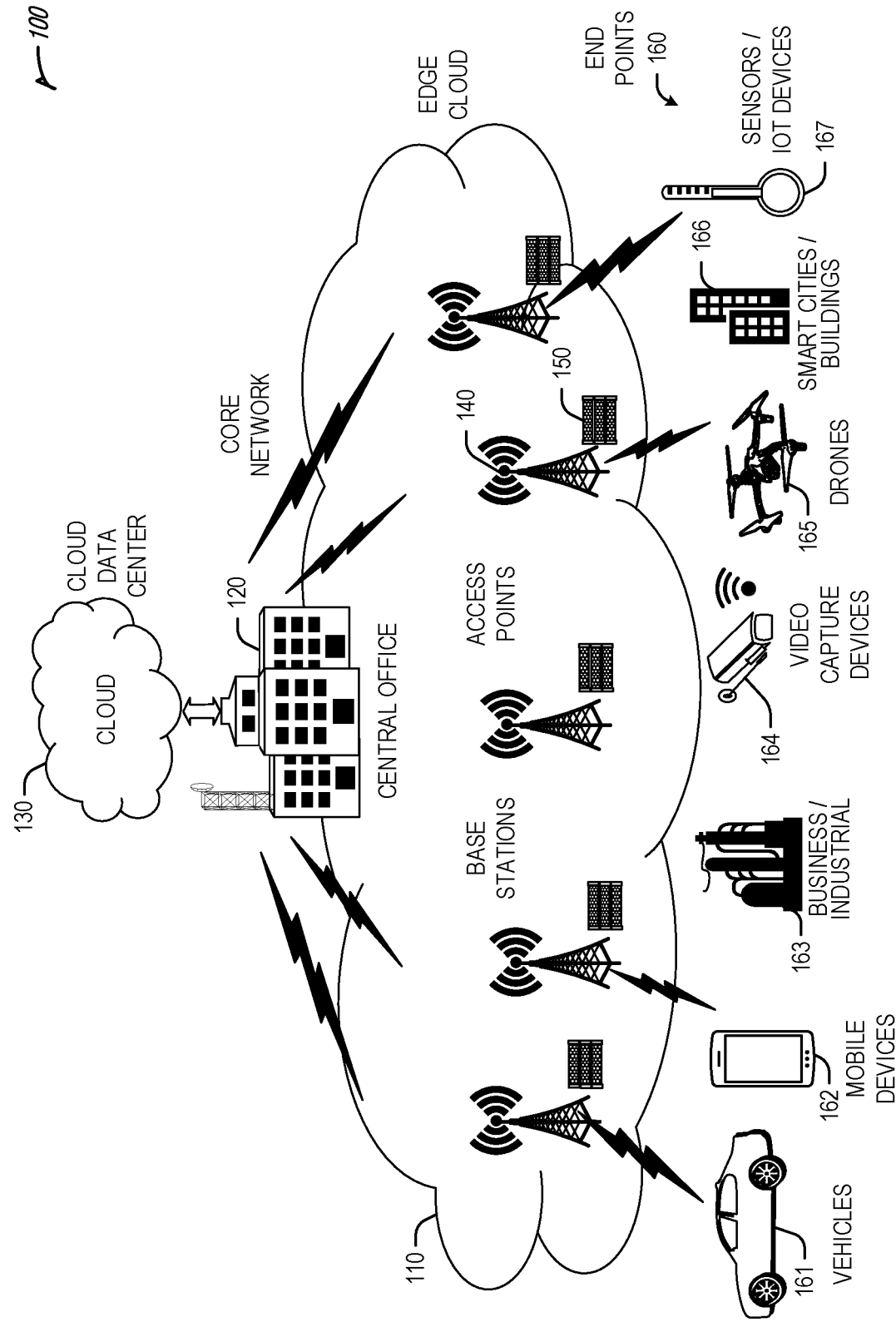
FIG. 1 illustrates an overview of an edge cloud configuration for edge computing.

Digital streaming of media content continues to be prevalent in today's society and is evolving as internet and wireless connectivity speeds are increasing. Immersive media such as Virtual Reality (VR), Augmented Reality (AR), and Mixed Reality (MR) streaming contains a large amount of two-dimensional and three-dimensional content. Streaming such content requires ultra-high bandwidth and constant interactivity (and connectivity) between a client device and a server. A challenging aspect of digital streaming is to selectively transport and deliver partial contents, such as a region of interest, content within a viewport, or the like, of the digital media (e.g., a video) to the device.

Real-time transport of partial contents presents multiple challenges, including: 1) the contents need to be partitioned and organized (e.g., compressed) in regions or blocks; and 2) the transporting or forwarding of the regions/blocks need to be performed selectively. The partitioning/organizing of the contents into regions/blocks is usually achieved by media codecs which may partition and encode contents. For example, modern video codecs like HEVC and AV1 operate on a "tile" concept that segments rectangular areas in video frames. To allow independent retrieval and decoding, HEVC has developed the concept of Motion Constraint Tile Sets (MCTS), and AV1 designed independently decodable tiles natively with motion constraints. In volumetric data, the "3D tile" concept (essentially 3D cubical space) is widely utilized in mesh, point cloud, and voxels. Therefore, media contents may be partitioned and encoded according to certain spatial structure.

Transporting or forwarding the regions or blocks selectively includes building a network delivery/transport framework to efficiently and flexibly forward contents to a spatially partitioned (e.g., into regions, blocks, or the like) video frame. In existing implementations for real-time media transport, the contents coming out of codecs are considered one integrated data payload that forms one data stream (or "bitstream" in terms of encoded media), from the perspectives of transport layers (e.g., Layer 5 or Layer 6), servers, and routers. Increasingly, however, applications such as VR, AR, MR, or the like, expect the capability to selectively deliver/transport only the relevant regions/blocks of contents in one data stream.

Furthermore, the selected content partitions usually vary during runtime based on the operation and feedback of clients (e.g., the viewport of an HMD, a "zoom" operation issued by the user, or the like). While some application-specific and content-specific implementations are available, it is necessary and beneficial to have a generic and scalable transport framework to support this kind of spatially partitioned content delivery both from network function and service perspectives. Existing implementations usually rely on parsing of the payload of each packet. The delivering/forwarding servers will open the packet and parse the payload (e.g., the encoded frames), then selectively decide whether or not to forward the packet to a given receiver. There are several disadvantages and obstacles to these types of systems.

First, the payload structure usually is associated with different content compression standards (e.g., different codecs). The parsing logic may have to be codec specific, meaning the parsing logic may require implementations for each different codec) and/or be application specific. Additionally, parsing an encoded bitstream is time consuming and computer resource consuming (e.g., memory consuming).

Secondly, the payload may be encrypted, and in that case, the payload may be parsed and analyzed only by the authenticated receivers. For example, in Secure Real Time Transport Protocol (SRTP), the payload may not be parsed by any intermediate servers. Thus, the approach of parsing a payload does not work for secure transport channels.

A further disadvantage is that the delivering/forwarding servers (also called "relay servers") may require knowledge of the content partition structure and media codec. For example, the delivering/forward/relay server must know how many "tiles" one frame may have. Therefore, implementations become tightly coupled with specific applications and specific content. This will impact the reusability and scalability of those implementations for deployment on different networks and different contents.

Other implementations such as Content Delivery Networks (CDN) use a file or files to accommodate and denote the spatial partitions of media content. However, the processing on the files and the transport (via HTTP) of those files may not meet real-time requirements with satisfying low-latency.

Disclosed herein are systems and methods that provide a unique and generic service for real-time VR/AR/MR/immersive media (XR) streaming. The service may be set up as a generic and versatile real-time communication edge network to support ultra-low latency transport for a wide range of immersive media applications. The disclosed system may provide a spatial partition/tile/slice-based Real-Time Transport Protocol (RTP) layer without the need to inspect the bitstream payload. Therefore, the disclosed system may save computation resources and reduce processing time. The disclosed system may use a generic partition/block based RTP packet transmission, thus the forwarding/delivering server is not required to be tightly coupled with media content structure. Additionally, the disclosed system may use spatial partition based parallel decoding, which may reduce/improve latency. And, the presently disclosed system may be applicable to encrypted payload and secure streaming channels, providing an advantage over the existing implementations.

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources may provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
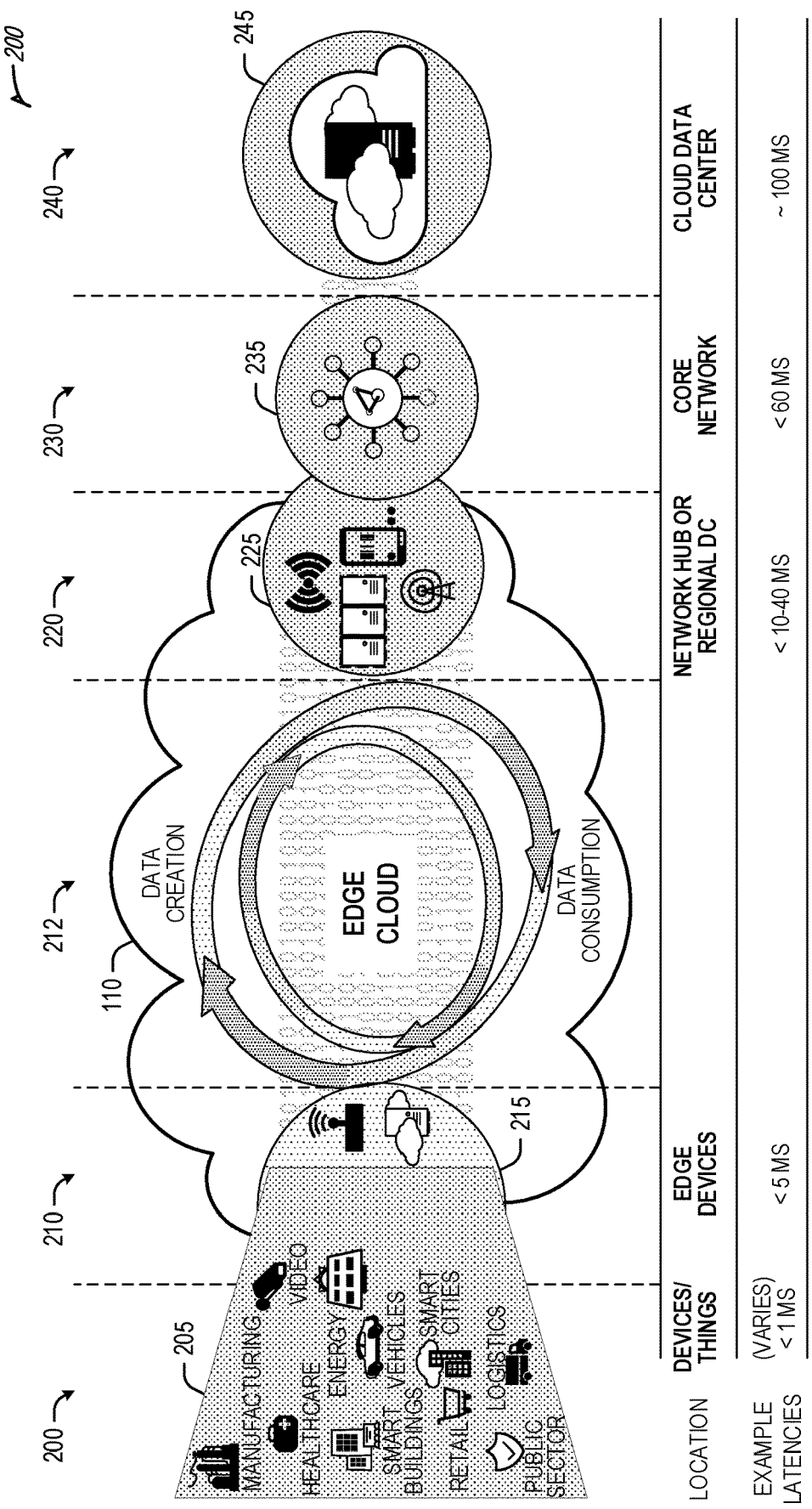
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local", "near", "middle", or "far" edge may be based on latency, distance, number of network hops, or other measurable characteristics, as measured from a source in any of the network layers 200-240.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge compute nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing devices. For example, the edge cloud 110 may include an appliance computing device that is a self-contained electronic device including a housing, a chassis, a case or a shell. In some circumstances, the housing may be dimensioned for portability such that it may be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 7B. The edge cloud 110 may also include one or more servers and/or one or more multi-tenant servers. Such a server may include an operating system and a virtual computing environment. A virtual computing environment may include a hypervisor managing (spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 3:
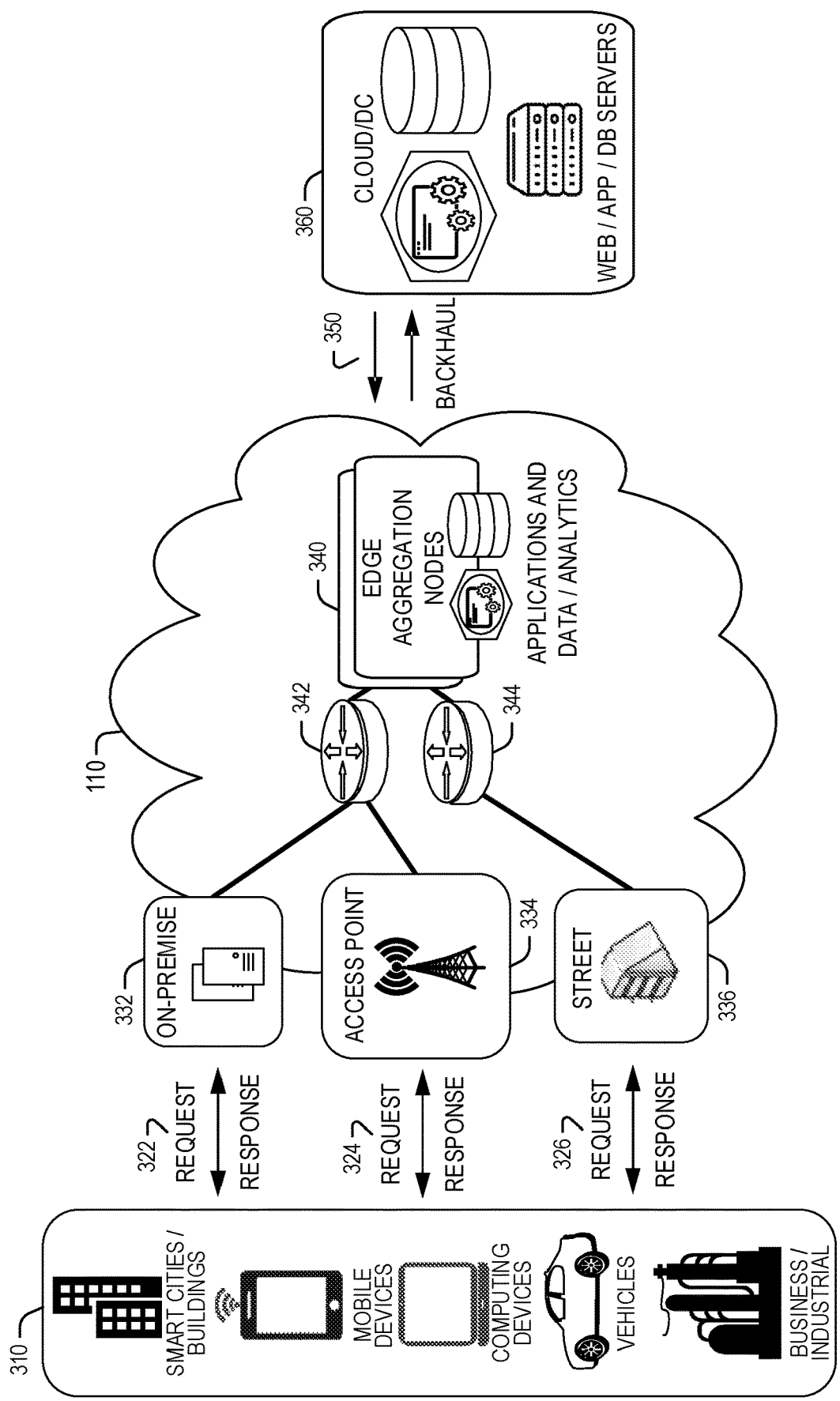
FIG. 3 illustrates an example approach for networking and services in an edge computing system.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure.

Figure 4:
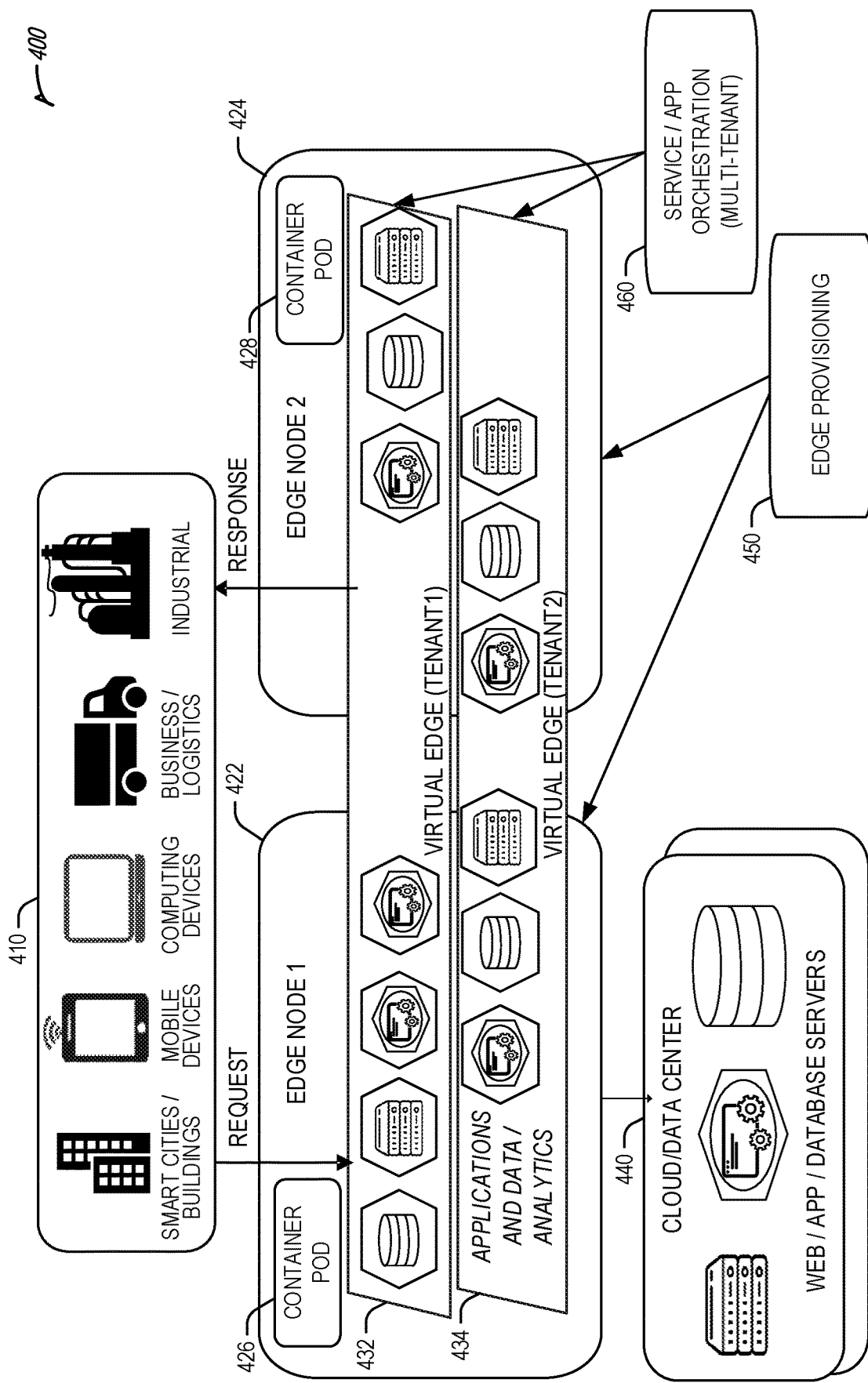
FIG. 4 illustrates deployment of a virtual edge configuration in an edge computing system operated among multiple edge nodes and multiple tenants.

FIG. 4 illustrates deployment and orchestration for virtual edge configurations across an edge computing system operated among multiple edge nodes and multiple tenants. Specifically. FIG. 4 depicts coordination of a first edge node 422 and a second edge node 424 in an edge computing system 400, to fulfill requests and responses for various client endpoints 410 (e.g., smart cities/building systems, mobile devices, computing devices, business/logistics systems, industrial systems, etc.), which access various virtual edge instances. Here, the virtual edge instances 432, 434 provide edge compute capabilities and processing in an edge cloud, with access to a cloud/data center 440 for higher-latency requests for websites, applications, database servers, etc. However, the edge cloud enables coordination of processing among multiple edge nodes for multiple tenants or entities.

In the example of FIG. 4, these virtual edge instances include: a first virtual edge 432, offered to a first tenant (Tenant 1), which offers a first combination of edge storage, computing, and services; and a second virtual edge 434, offering a second combination of edge storage, computing, and services. The virtual edge instances 432, 434 are distributed among the edge nodes 422, 424, and may include scenarios in which a request and response are fulfilled from the same or different edge nodes. The configuration of the edge nodes 422, 424 to operate in a distributed yet coordinated fashion occurs based on edge provisioning functions 450. The functionality of the edge nodes 422, 424 to provide coordinated operation for applications and services, among multiple tenants, occurs based on orchestration functions 460.

It should be understood that some of the devices in 410 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A ROT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The ROT may further be used for a trusted computing context to enable a "fan-out" that is useful for supporting multi-tenancy. Within a multi-tenant environment, the respective edge nodes 422, 424 may operate as security feature enforcement points for local resources allocated to multiple tenants per node. Additionally, tenant runtime and application execution (e.g., in instances 432, 434) may serve as an enforcement point for a security feature that creates a virtual edge abstraction of resources spanning potentially multiple physical hosting platforms. Finally, the orchestration functions 460 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes consisting of containers, FaaS engines, Servlets, servers, or other computation abstraction may be partitioned according to a DICE layering and fan-out structure to support a RoT context for each. Accordingly, the respective RoTs spanning devices 410, 422, and 440 may coordinate the establishment of a distributed trusted computing base (DTCB) such that a tenant-specific virtual trusted secure channel linking all elements end to end may be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 4. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 422, 424 may implement the use of containers, such as with the use of a container "pod" 426, 428 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 432, 434 are partitioned according to the needs of each container.

With the use of container pods, a pod controller oversees the partitioning and allocation of containers and resources. The pod controller receives instructions from an orchestrator (e.g., orchestrator 460) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries may still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 460 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 5:
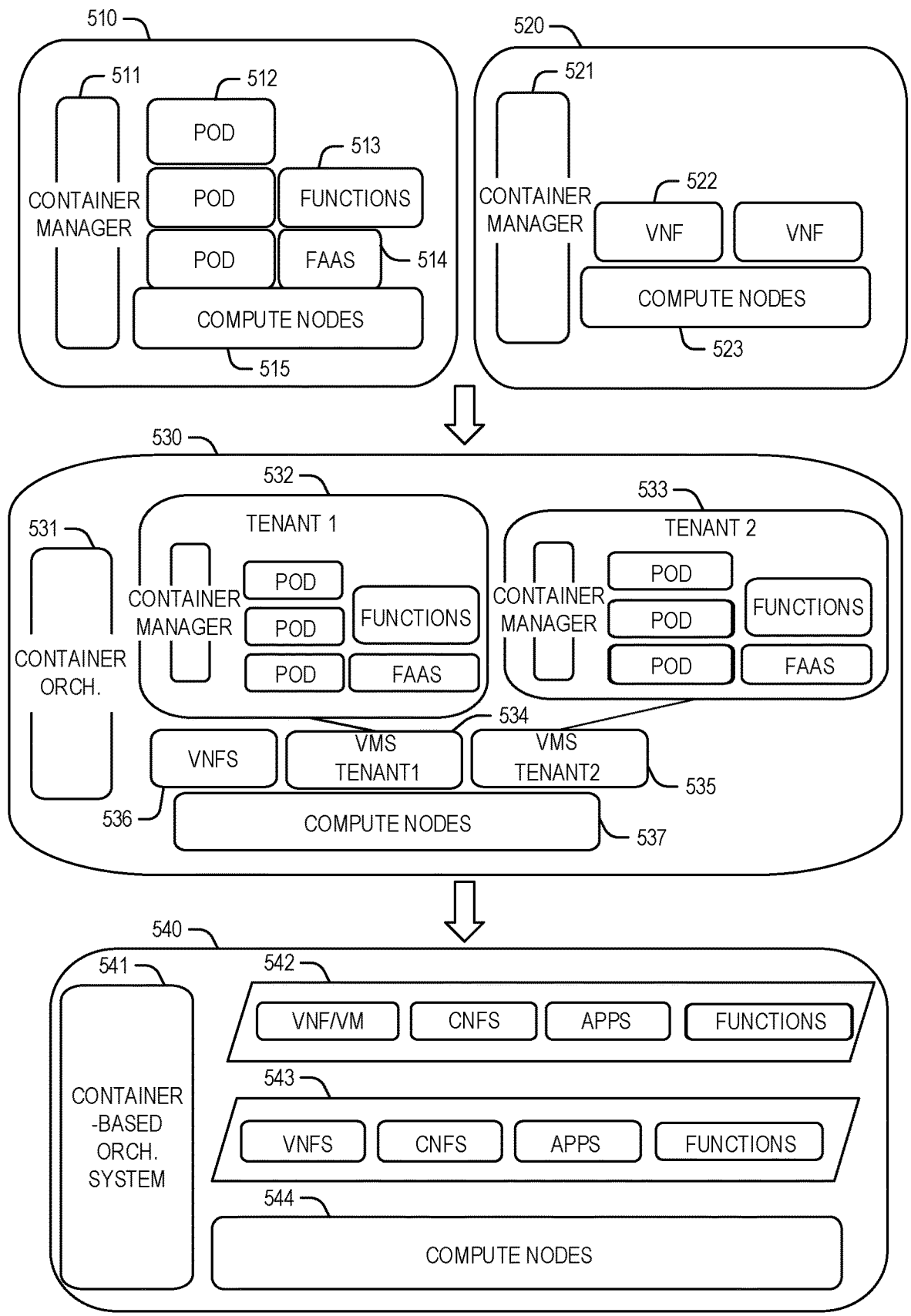
FIG. 5 illustrates various compute arrangements deploying containers in an edge computing system.

FIG. 5 illustrates additional compute arrangements deploying containers in an edge computing system. As a simplified example, system arrangements 510, 520 depict settings in which a pod controller (e.g., container managers 511, 521, and container orchestrator 531) is adapted to launch containerized pods, functions, and functions-as-a-service instances through execution via compute nodes (515 in arrangement 510), or to separately execute containerized virtualized network functions through execution via compute nodes (523 in arrangement 520). This arrangement is adapted for use of multiple tenants in system arrangement 530 (using compute nodes 537), where containerized pods (e.g., pods 512), functions (e.g., functions 513, VNFs 522, 536), and functions-as-a-service instances (e.g., FaaS instance 514) are launched within virtual machines (e.g., VMs 534, 535 for tenants 532, 533) specific to respective tenants (aside the execution of virtualized network functions). This arrangement is further adapted for use in system arrangement 540, which provides containers 542, 543, or execution of the various functions, applications, and functions on compute nodes 544, as coordinated by an container-based orchestration system 541.

The system arrangements of depicted in FIG. 5 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications may be split across multiple edge owners, coordinated by an orchestrator.

In the context of FIG. 5, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 6:
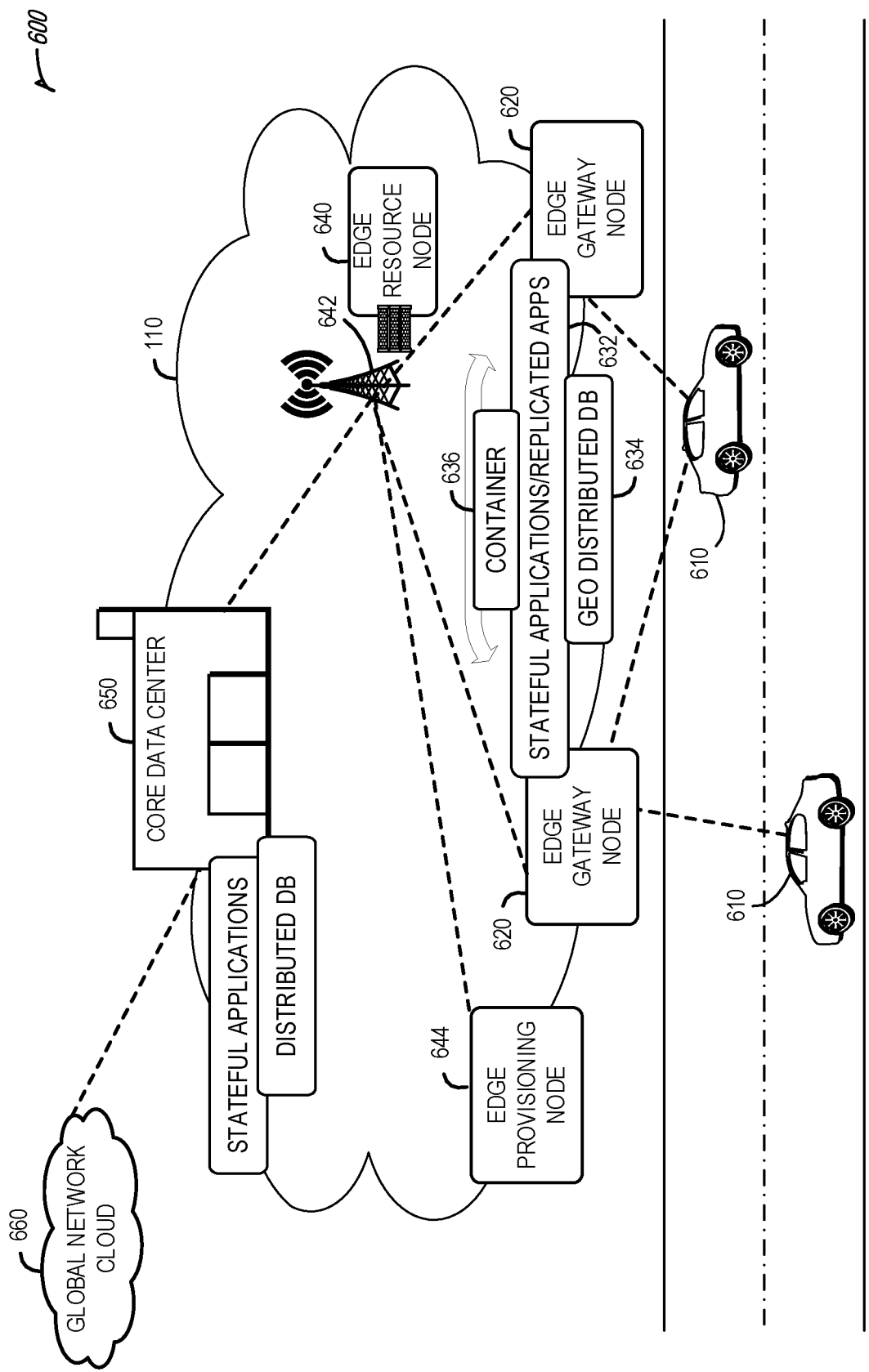
FIG. 6 illustrates a compute and communication use case involving mobile access to applications in an edge computing system.

It should be appreciated that the edge computing systems and arrangements discussed herein may be applicable in various solutions, services, and/or use cases involving mobility. As an example, FIG. 6 shows a simplified vehicle compute and communication use case involving mobile access to applications in an edge computing system 600 that implements an edge cloud 110. In this use case, respective client compute nodes 610 may be embodied as in-vehicle compute systems (e.g., in-vehicle navigation and/or infotainment systems) located in corresponding vehicles which communicate with the edge gateway nodes 620 during traversal of a roadway. For instance, the edge gateway nodes 620 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 610 and a particular edge gateway device 620 may propagate so as to maintain a consistent connection and context for the client compute node 610. Likewise, mobile edge nodes may aggregate at the high priority services or according to the throughput or latency resolution requirements for the underlying service(s) (e.g., in the case of drones). The respective edge gateway devices 620 include an amount of processing and storage capabilities and, as such, some processing and/or storage of data for the client compute nodes 610 may be performed on one or more of the edge gateway devices 620.

The edge gateway devices 620 may communicate with one or more edge resource nodes 640, which are illustratively embodied as compute servers, appliances or components located at or in a communication base station 642 (e.g., a based station of a cellular network). As discussed above, the respective edge resource nodes 640 include an amount of processing and storage capabilities and, as such, some processing and/or storage of data for the client compute nodes 610 may be performed on the edge resource node 640. For example, the processing of data that is less urgent or important may be performed by the edge resource node 640, while the processing of data that is of a higher urgency or importance may be performed by the edge gateway devices 620 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves may be activated (e.g., through a local orchestrator) to provide additional resources to meet the new demand (e.g., adapt the compute resources to the workload data).

The edge resource node(s) 640 also communicate with the core data center 650, which may include compute servers, appliances, and/or other components located in a central location (e.g., a central office of a cellular communication network). The core data center 650 may provide a gateway to the global network cloud 660 (e.g., the Internet) for the edge cloud 110 operations formed by the edge resource node(s) 640 and the edge gateway devices 620. Additionally, in some examples, the core data center 650 may include an amount of processing and storage capabilities and, as such, some processing and/or storage of data for the client compute devices may be performed on the core data center 650 (e.g., processing of low urgency or importance, or high complexity).

The edge gateway nodes 620 or the edge resource nodes 640 may offer the use of stateful applications 632 and a geographic distributed database 634. Although the applications 632 and database 634 are illustrated as being horizontally distributed at a layer of the edge cloud 110, it will be understood that resources, services, or other components of the application may be vertically distributed throughout the edge cloud (including, part of the application executed at the client compute node 610, other parts at the edge gateway nodes 620 or the edge resource nodes 640, etc.). Additionally, as stated previously, there may be peer relationships at any level to meet service objectives and obligations. Further, the data for a specific client or application may move from edge to edge based on changing conditions (e.g., based on acceleration resource availability, following the car movement, etc.). For instance, based on the "rate of decay" of access, prediction may be made to identify the next owner to continue, or when the data or computational access will no longer be viable. These and other services may be utilized to complete the work that is needed to keep the transaction compliant and lossless.

In further scenarios, a container 636 (or pod of containers) may be flexibly migrated from an edge node 620 to other edge nodes (e.g., 620, 640, etc.) such that the container with an application and workload does not need to be reconstituted, re-compiled, re-interpreted in order for migration to work. However, in such settings, there may be some remedial or "swizzling" translation operations applied. For example, the physical hardware at node 640 may differ from edge gateway node 620 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 6 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 620, some others at the edge resource node 640, and others in the core data center 650 or global network cloud 660.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 600 may include or be in communication with an edge provisioning node 644. The edge provisioning node 644 may distribute software such as the example computer readable instructions 782 of FIG. 7B, to various receiving parties for implementing any of the methods described herein. The example edge provisioning node 644 may be implemented by any computer server, home server, content delivery network, virtual server, software distribution system, central facility, storage device, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 644. For example, the entity that owns and/or operates the edge provisioning node 644 may be a developer, a seller, and/or a licensor (or a customer and/or consumer thereof) of software instructions such as the example computer readable instructions 782 of FIG. 7B. The receiving parties may be consumers, service providers, users, retailers, OEMs, etc., who purchase and/or license the software instructions for use and/or re-sale and/or sub-licensing.

In an example, edge provisioning node 644 includes one or more servers and one or more storage devices. The storage devices host computer readable instructions such as the example computer readable instructions 782 of FIG. 7B, as described below. Similarly to edge gateway devices 620 described above, the one or more servers of the edge provisioning node 644 are in communication with a base station 642 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third party payment entity. The servers enable purchasers and/or licensors to download the computer readable instructions 782 from the edge provisioning node 644. For example, the software instructions, which may correspond to the example computer readable instructions 782 of FIG. 7B, may be downloaded to the example processor platform/s, which is to execute the computer readable instructions 782 to implement the methods described herein.

In some examples, the processor platform(s) that execute the computer readable instructions 782 may be physically located in different geographic locations, legal jurisdictions, etc. In some examples, one or more servers of the edge provisioning node 644 periodically offer, transmit, and/or force updates to the software instructions (e.g., the example computer readable instructions 782 of FIG. 7B) to ensure improvements, patches, updates, etc. are distributed and applied to the software instructions implemented at the end user devices. In some examples, different components of the computer readable instructions 782 may be distributed from different sources and/or to different processor platforms; for example, different libraries, plug-ins, components, and other types of compute modules, whether compiled or interpreted, may be distributed from different sources and/or to different processor platforms. For example, a portion of the software instructions (e.g., a script that is not, in itself, executable) may be distributed from a first source while an interpreter (capable of executing the script) may be distributed from a second source.

In further examples, any of the compute nodes or devices discussed with reference to the present edge computing systems and environment may be fulfilled based on the components depicted in FIGS. 7A and 7B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 7A:
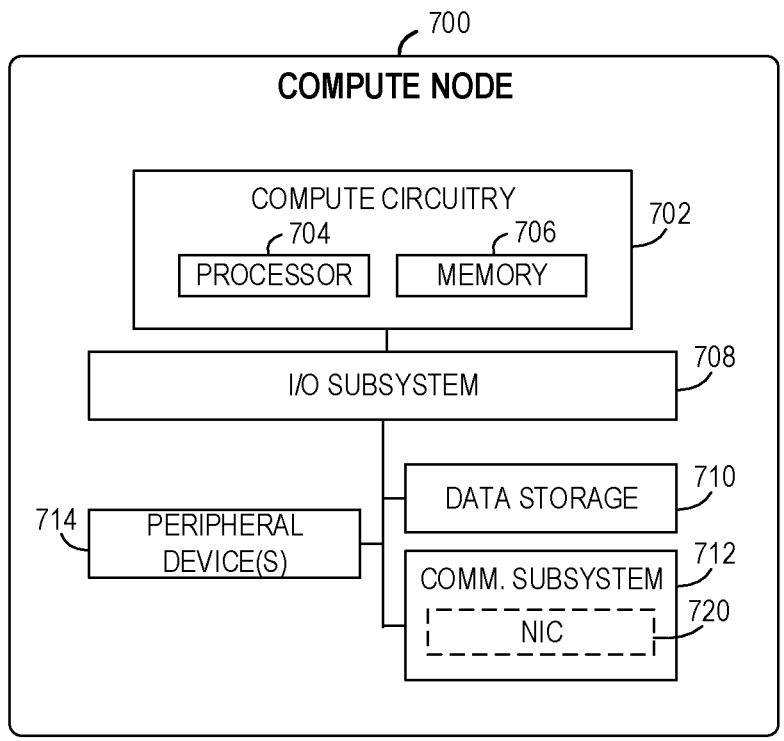
FIG. 7A provides an overview of example components for compute deployed at a compute node in an edge computing system.

In the simplified example depicted in FIG. 7A, an edge compute node 700 includes a compute engine (also referred to herein as "compute circuitry") 702, an input/output (I/O) subsystem 708, data storage 710, a communication circuitry subsystem 712, and, optionally, one or more peripheral devices 714. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 700 may be embodied as any type of engine, device, or collection of devices capable of performing various compute functions. In some examples, the compute node 700 may be embodied as a single device such as an integrated circuit, an embedded system, a field-programmable gate array (FPGA), a system-on-a-chip (SOC), or other integrated system or device. In the illustrative example, the compute node 700 includes or is embodied as a processor 704 and a memory 706. The processor 704 may be embodied as any type of processor capable of performing the functions described herein (e.g., executing an application). For example, the processor 704 may be embodied as a multi-core processor(s), a microcontroller, a processing unit, a specialized or special purpose processing unit, or other processor or processing/controlling circuit.

In some examples, the processor 704 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 704 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 704 may work in coordination with each other to execute many types of operations and instructions within and on behalf of the compute node 700.

The memory 706 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 706 may be integrated into the processor 704. The memory 706 may store various software and data used during operation such as one or more applications, data operated on by the application(s), libraries, and drivers.

The compute circuitry 702 is communicatively coupled to other components of the compute node 700 via the I/O subsystem 708, which may be embodied as circuitry and/or components to facilitate input/output operations with the compute circuitry 702 (e.g., with the processor 704 and/or the main memory 706) and other components of the compute circuitry 702. For example, the I/O subsystem 708 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 708 may form a portion of a system-on-a-chip (SoC) and be incorporated, along with one or more of the processor 704, the memory 706, and other components of the compute circuitry 702, into the compute circuitry 702.

The one or more illustrative data storage devices 710 may be embodied as any type of devices configured for short-term or long-term storage of data such as, for example, memory devices and circuits, memory cards, hard disk drives, solid-state drives, or other data storage devices. Individual data storage devices 710 may include a system partition that stores data and firmware code for the data storage device 710. Individual data storage devices 710 may also include one or more operating system partitions that store data files and executables for operating systems depending on, for example, the type of compute node 700.

The communication circuitry 712 may be embodied as any communication circuit, device, or collection thereof, capable of enabling communications over a network between the compute circuitry 702 and another compute device (e.g., an edge gateway of an implementing edge computing system). The communication circuitry 712 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 712 includes a network interface controller (NIC) 720, which may also be referred to as a host fabric interface (HFI). The NIC 720 may be embodied as one or more add-in-boards, daughter cards, network interface cards, controller chips, chipsets, or other devices that may be used by the compute node 700 to connect with another compute device (e.g., an edge gateway node). In some examples, the NIC 720 may be embodied as part of a system-on-a-chip (SoC) that includes one or more processors, or included on a multichip package that also contains one or more processors. In some examples, the NIC 720 may include a local processor (not shown) and/or a local memory (not shown) that are both local to the NIC 720. In such examples, the local processor of the NIC 720 may be capable of performing one or more of the functions of the compute circuitry 702 described herein. Additionally, or alternatively, in such examples, the local memory of the NIC 720 may be integrated into one or more components of the client compute node at the board level, socket level, chip level, and/or other levels.

Additionally, in some examples, a respective compute node 700 may include one or more peripheral devices 714. Such peripheral devices 714 may include any type of peripheral device found in a compute device or server such as audio input devices, a display, other input/output devices, interface devices, and/or other peripheral devices, depending on the particular type of the compute node 700. In further examples, the compute node 700 may be embodied by a respective edge compute node (whether a client, gateway, or aggregation node) in an edge computing system or like forms of appliances, computers, subsystems, circuitry, or other components.

Figure 7B:
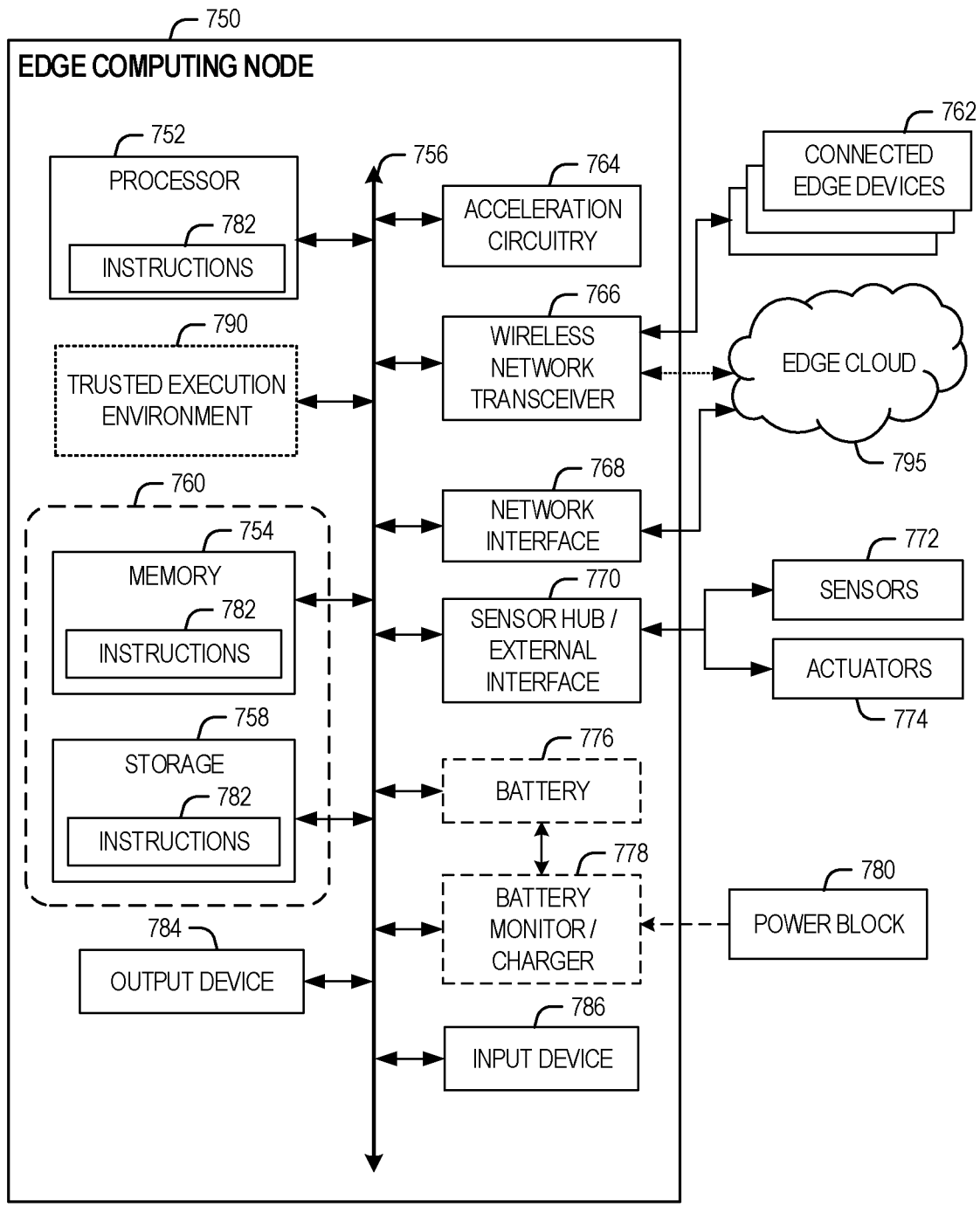
FIG. 7B provides a further overview of example components within a computing device in an edge computing system.

In a more detailed example, FIG. 7B illustrates a block diagram of an example of components that may be present in an edge computing node 750 for implementing the techniques (e.g., operations, processes, methods, and methodologies) described herein. This edge computing node 750 provides a closer view of the respective components of node 700 when implemented as or as part of a computing device (e.g., as a mobile device, a base station, server, gateway, etc.). The edge computing node 750 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 750, or as components otherwise incorporated within a chassis of a larger system.

The edge computing device 750 may include processing circuitry in the form of a processor 752, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 752 may be a part of a system on a chip (SoC) in which the processor 752 and other components are formed into a single integrated circuit, or a single package, such as the Edison™ or Galileo™ SoC boards from Intel Corporation, Santa Clara, California. As an example, the processor 752 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 752 and accompanying circuitry may be provided in a single socket form factor, multiple socket form factor, or a variety of other formats, including in limited hardware configurations or configurations that include fewer than all elements shown in FIG. 7B.

The processor 752 may communicate with a system memory 754 over an interconnect 756 (e.g., a bus). Any number of memory devices may be used to provide for a given amount of system memory. As examples, the memory 754 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 758 may also couple to the processor 752 via the interconnect 756. In an example, the storage 758 may be implemented via a solid-state disk drive (SSDD). Other devices that may be used for the storage 758 include flash memory cards, such as Secure Digital (SD) cards, microSD cards, extreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 758 may be on-die memory or registers associated with the processor 752. However, in some examples, the storage 758 may be implemented using a micro hard disk drive (HDD). Further, any number of new technologies may be used for the storage 758 in addition to, or instead of, the technologies described, such resistance change memories, phase change memories, holographic memories, or chemical memories, among others.

The components may communicate over the interconnect 756. The interconnect 756 may include any number of technologies, including industry standard architecture (ISA), extended ISA (EISA), peripheral component interconnect (PCI), peripheral component interconnect extended (PCIx), PCI express (PCIe), or any number of other technologies. The interconnect 756 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 756 may couple the processor 752 to a transceiver 766, for communications with the connected edge devices 762. The transceiver 766 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 762. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 766 (or multiple transceivers) may communicate using multiple standards or radios for communications at a different range. For example, the edge computing node 750 may communicate with close devices, e.g., within about 10 meters, using a local transceiver based on Bluetooth Low Energy (BLE), or another low power radio, to save power. More distant connected edge devices 762, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 766 (e.g., a radio transceiver) may be included to communicate with devices or services in the edge cloud 795 via local or wide area network protocols. The wireless network transceiver 766 may be a low-power wide-area (LPWA) transceiver that follows the IEEE 802.15.4, or IEEE 802.15.4g standards, among others. The edge computing node 750 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 766, as described herein. For example, the transceiver 766 may include a cellular transceiver that uses spread spectrum (SPA/SAS) communications for implementing high-speed communications. Further, any number of other protocols may be used, such as Wi-Fi® networks for medium speed communications and provision of network communications. The transceiver 766 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 768 may be included to provide a wired communication to nodes of the edge cloud 795 or to other devices, such as the connected edge devices 762 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 768 may be included to enable connecting to a second network, for example, a first NIC 768 providing communications to the cloud over Ethernet, and a second NIC 768 providing communications to other devices over another type of network.

Given the variety of types of applicable communications from the device to another component or network, applicable communications circuitry used by the device may include or be embodied by any one or more of components 764, 766, 768, or 770. Accordingly, in various examples, applicable means for communicating (e.g., receiving, transmitting, etc.) may be embodied by such communications circuitry.

The edge computing node 750 may include or be coupled to acceleration circuitry 764, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 756 may couple the processor 752 to a sensor hub or external interface 770 that is used to connect additional devices or subsystems. The devices may include sensors 772, such as accelerometers, level sensors, flow sensors, optical light sensors, camera sensors, temperature sensors, global navigation system (e.g., GPS) sensors, pressure sensors, barometric pressure sensors, and the like. The hub or interface 770 further may be used to connect the edge computing node 750 to actuators 774, such as power switches, valve actuators, an audible sound generator, a visual warning device, and the like.

In some optional examples, various input/output (I/O) devices may be present within or connected to, the edge computing node 750. For example, a display or other output device 784 may be included to show information, such as sensor readings or actuator position. An input device 786, such as a touch screen or keypad may be included to accept input. An output device 784 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 750. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 776 may power the edge computing node 750, although, in examples in which the edge computing node 750 is mounted in a fixed location, it may have a power supply coupled to an electrical grid, or the battery may be used as a backup or for temporary capabilities. The battery 776 may be a lithium ion battery, or a metal-air battery, such as a zinc-air battery, an aluminum-air battery, a lithium-air battery, and the like.

A battery monitor/charger 778 may be included in the edge computing node 750 to track the state of charge (SoCh) of the battery 776, if included. The battery monitor/charger 778 may be used to monitor other parameters of the battery 776 to provide failure predictions, such as the state of health (SoH) and the state of function (SoF) of the battery 776. The battery monitor/charger 778 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 778 may communicate the information on the battery 776 to the processor 752 over the interconnect 756. The battery monitor/charger 778 may also include an analog-to-digital (ADC) converter that enables the processor 752 to directly monitor the voltage of the battery 776 or the current flow from the battery 776. The battery parameters may be used to determine actions that the edge computing node 750 may perform, such as transmission frequency, mesh network operation, sensing frequency, and the like.

A power block 780, or other power supply coupled to a grid, may be coupled with the battery monitor/charger 778 to charge the battery 776. In some examples, the power block 780 may be replaced with a wireless power receiver to obtain the power wirelessly, for example, through a loop antenna in the edge computing node 750. A wireless battery charging circuit, such as an LTC4020 chip from Linear Technologies of Milpitas, California, among others, may be included in the battery monitor/charger 778. The specific charging circuits may be selected based on the size of the battery 776, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 758 may include instructions 782 in the form of software, firmware, or hardware commands to implement the techniques described herein. Although such instructions 782 are shown as code blocks included in the memory 754 and the storage 758, it may be understood that any of the code blocks may be replaced with hardwired circuits, for example, built into an application specific integrated circuit (ASIC).

In an example, the instructions 782 provided via the memory 754, the storage 758, or the processor 752 may be embodied as a non-transitory, machine-readable medium 760 including code to direct the processor 752 to perform electronic operations in the edge computing node 750. The processor 752 may access the non-transitory, machine-readable medium 760 over the interconnect 756. For instance, the non-transitory, machine-readable medium 760 may be embodied by devices described for the storage 758 or may include specific storage units such as optical disks, flash drives, or any number of other hardware devices. The non-transitory, machine-readable medium 760 may include instructions to direct the processor 752 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 782 on the processor 752 (separately, or in combination with the instructions 782 of the machine readable medium 760) may configure execution or operation of a trusted execution environment (TEE) 790. In an example, the TEE 790 operates as a protected area accessible to the processor 752 for secure execution of instructions and secure access to data. Various implementations of the TEE 790, and an accompanying secure area in the processor 752 or the memory 754 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 750 through the TEE 790 and the processor 752.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 7C:
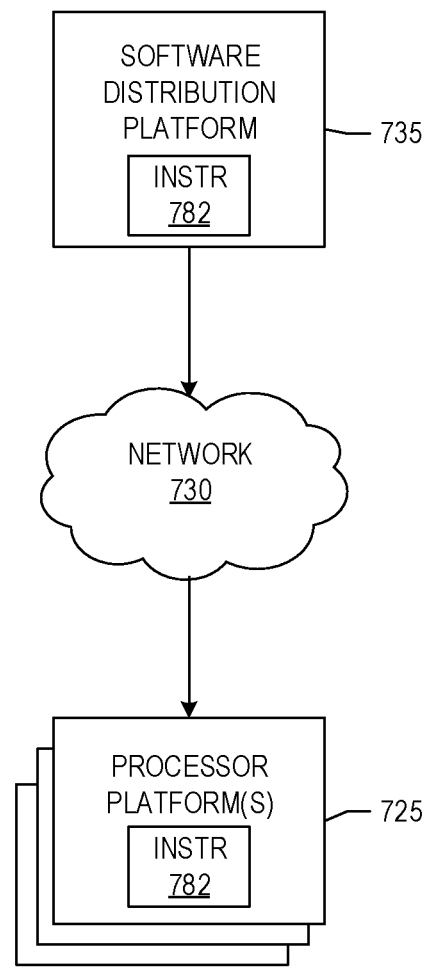
FIG. 7C illustrates an example software distribution platform to distribute software to one or more devices.

FIG. 7C illustrates an example software distribution platform 735 to distribute software, such as the example computer readable instructions 782 of FIG. 7B, to one or more devices, such as example processor platform(s) 735 and/or example connected Edge devices 310 of FIG. 3. The example software distribution platform 735 may be implemented by any computer server, data facility, cloud service, etc., capable of storing and transmitting software to other computing devices (e.g., third parties, the example connected Edge devices 310 of FIG. 3). Example connected Edge devices may be customers, clients, managing devices (e.g., servers), third parties (e.g., customers of an entity owning and/or operating the software distribution platform 735). Example connected Edge devices may operate in commercial and/or home automation environments. In some examples, a third party is a developer, a seller, and/or a licensor of software such as the example computer readable instructions 782 of FIG. 7B. The third parties may be consumers, users, retailers, OEMs, etc., that purchase and/or license the software for use and/or re-sale and/or sub-licensing. In some examples, distributed software causes display of one or more user interfaces (UIs) and/or graphical user interfaces (GUIs) to identify the one or more devices (e.g., connected Edge devices) geographically and/or logically separated from each other (e.g., physically separated IoT devices chartered with the responsibility of water distribution control (e.g., pumps), electricity distribution control (e.g., relays), etc.).

In the illustrated example of FIG. 7C, the software distribution platform 735 includes one or more servers and one or more storage devices. The storage devices store the computer readable instructions 782, which may correspond to the example computer readable instructions, as described above. The one or more servers of the example software distribution platform 735 are in communication with a network 730, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or via a third-party payment entity. The servers enable purchasers and/or licensors to download the computer readable instructions 782 from the software distribution platform 735. For example, the software, which may correspond to the example computer readable instructions, may be downloaded to the example processor platform(s) 735 (e.g., example connected Edge devices), which is/are to execute the computer readable instructions 782 to implement the content partition based real time communication for immersive media. In some examples, one or more servers of the software distribution platform 735 are communicatively connected to one or more security domains and/or security devices through which requests and transmissions of the example computer readable instructions 782 must pass. In some examples, one or more servers of the software distribution platform 735 periodically offer, transmit, and/or force updates to the software (e.g., the example computer readable instructions 782 of FIG. 7B) to ensure improvements, patches, updates, etc., are distributed and applied to the software at the end user devices.

In the illustrated example of FIG. 7C, the computer readable instructions 782 are stored on storage devices of the software distribution platform 735 in a particular format. A format of computer readable instructions includes, but is not limited to a particular code language (e.g., Java, JavaScript, Python, C, C #, SQL, HTML, etc.), and/or a particular code state (e.g., uncompiled code (e.g., ASCII), interpreted code, linked code, executable code (e.g., a binary), etc.). In some examples, the computer readable instructions 782 stored in the software distribution platform 735 are in a first format when transmitted to the example processor platform(s) 735. In some examples, the first format is an executable binary in which particular types of the processor platform(s) 735 may execute. However, in some examples, the first format is uncompiled code that requires one or more preparation tasks to transform the first format to a second format to enable execution on the example processor platform(s) 735. For instance, the receiving processor platform(s) 735 may need to compile the computer readable instructions 782 in the first format to generate executable code in a second format that is capable of being executed on the processor platform(s) 735. In still other examples, the first format is interpreted code that, upon reaching the processor platform(s) 735, is interpreted by an interpreter to facilitate execution of instructions.

Figure 8:
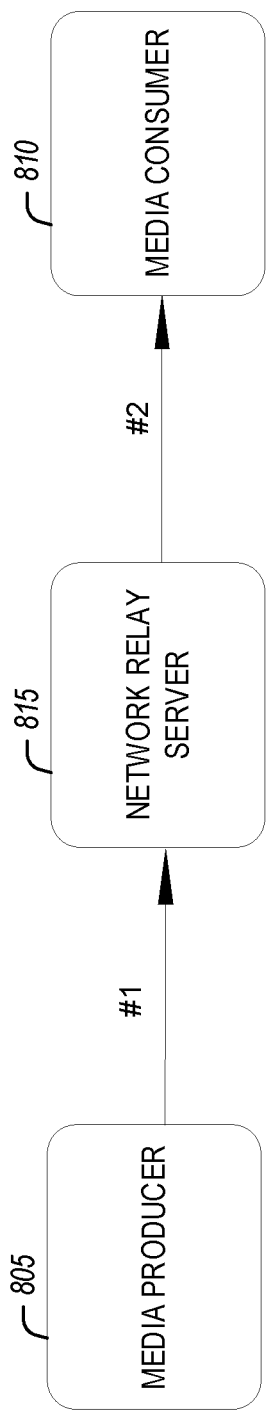
FIG. 8 illustrates an example of a generic model of media content delivery.

FIG. 8 illustrates an example of a generic model 800 of media content delivery. The generic model of media content delivery may include a media producer 805 which generates and originates media content. The media content may include 3D Point Cloud construction, view stitching in 360 degree (surround) video, or the like. A media consumer 810 is an entity that receives and consumes the content. The media consumer 810 may be a device (e.g., a smartphone, tablet, or the like) rendering the media content such as video to a screen. In an example, the media consumer 810 may be a terminal PC running video analysis, displaying video, or the like. A network relay 815 may be a chained and tiered network of servers. The network relay 815 may be a content delivery network (CDN), which is a network of network relay 815 servers based on a hypertext transport protocol (HTTP) but is generally not suitable for real-time media delivery. Real-time media delivery is usually based on real-time transport protocol (RTP) over user datagram protocol (UDP). The collection of real-time network relay 815 servers is also referred to as an RTC Cloud.

As immersive media (XR) is emerging and evolving, there are new requirements beyond the generic model 800 illustrated in FIG. 8 needed to deliver the media content. For example, the media consumer 810 may need only partial/some of the content that the media producer 805 has generated and may require real-time transport. In an example, the media consumer 810 may require only content that represents a region of interest or a zoomed in portion of the media content. Such content may be delivered in an amount of time expected by the media consumer 810 in order to create an immersive experience. In an example, there may be an exchange/interactivity of data between the network relay 815 server and the media consumer 810. This exchange may be accomplished using dual-direction transports that may be implemented by RTP/RTCP pairs. Therefore, the architecture from end-to-end requires new changes.

Figure 9:
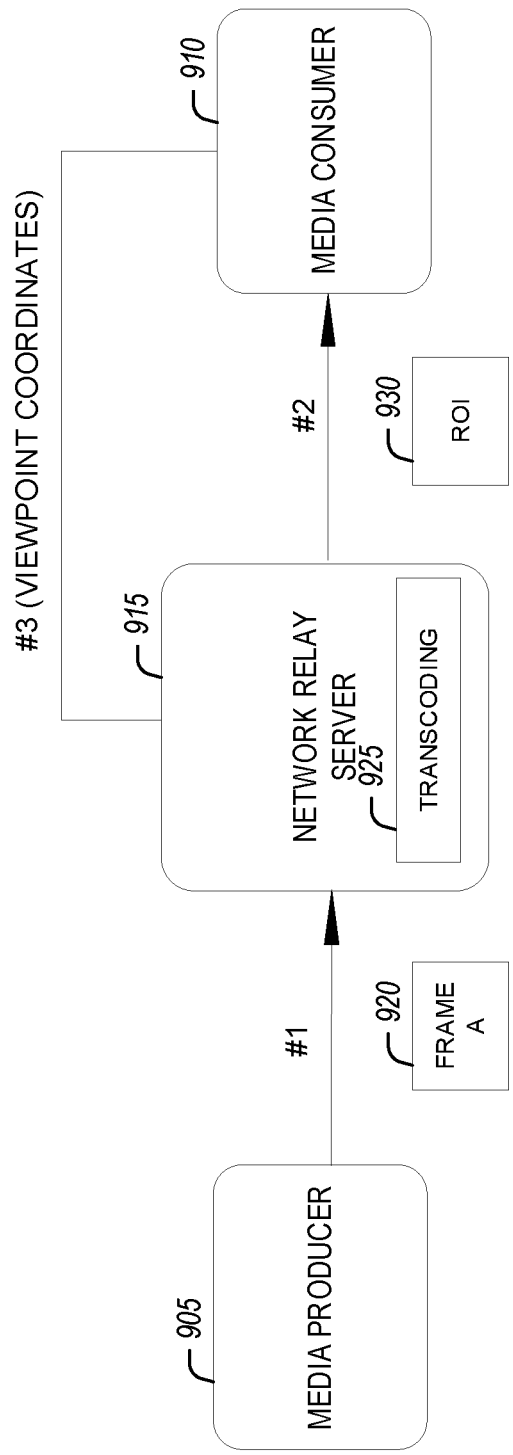
FIG. 9 illustrates an example of transcoding content in relay servers in the generic model of media content delivery.

FIG. 9 illustrates an example of transcoding content in relay servers in the generic model 900 of media content delivery. In an example, a transcoding 925 component, module, or the like may be added to one or more relay servers of the network relay servers 915. The transcoding component may convert the input content (e.g., the content from a media producer 905) which may be a frame 920 of the media content, to output content (e.g., content from the network relay server 915). In an example, the output content may be a region of interest (ROI) 930 of the input frame 920 (e.g., based on viewpoint coordinates, etc.). The media consumer 910 may provide feedback to the network relay servers 915. In an example, the feedback may be a head-mounted display (HMD) viewpoint coordinates. During the transcoding process, contents may be decoded, selected, and re-encoded. This implementation illustrated in FIG. 9 is a computation intensive process that may use network relay servers 915 equipped with high-end GPUs. Additionally, the network relay servers 915 may have knowledge of the domain of the media content and usage.

Figure 10:
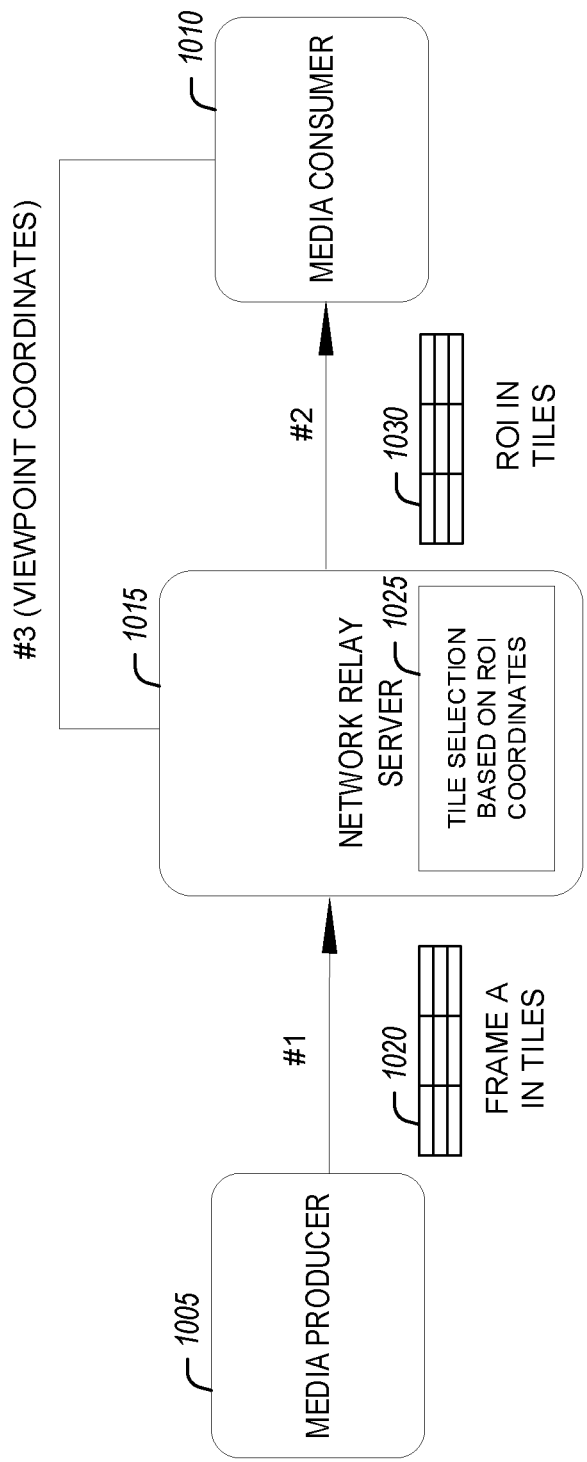
FIG. 10 illustrates an example selection of spatially partitioned content in a relay server.

FIG. 10 illustrates an example selection of spatially partitioned content 1000 in a network relay server 1015. Another possible implementation, as illustrated in FIG. 10, is for a media producer 1005 to generate and encode spatially partitioned content in advance of sending the content to the network relay servers 1015. In an example, the media content may be partitioned into tiles 1020 that the network relay servers 1015 will not have to transcode (e.g., decode and encode). Such an implementation may save time and resources of the network relay servers 1015, but selection logic 1025 of the content is tightly coupled with the media content and the media domain knowledge. For example, the region of interest coordinates (e.g., pitch, yaw, and roll in 360 video) may to be mapped into two-dimensional tiles 1030 for the content to be delivered to a media consumer 1040. Also, the network relay servers 1015 are capable of parsing the payload (e.g., media codec, the specific header, partition structure, or the like). Additionally, the codecs that allow such tile-based encoding may use special coding. Thus, the approaches illustrated in FIGS. 9 and 10 may not be usable when the payload is encrypted because no parsing or decoding is allowed.

Figure 11:
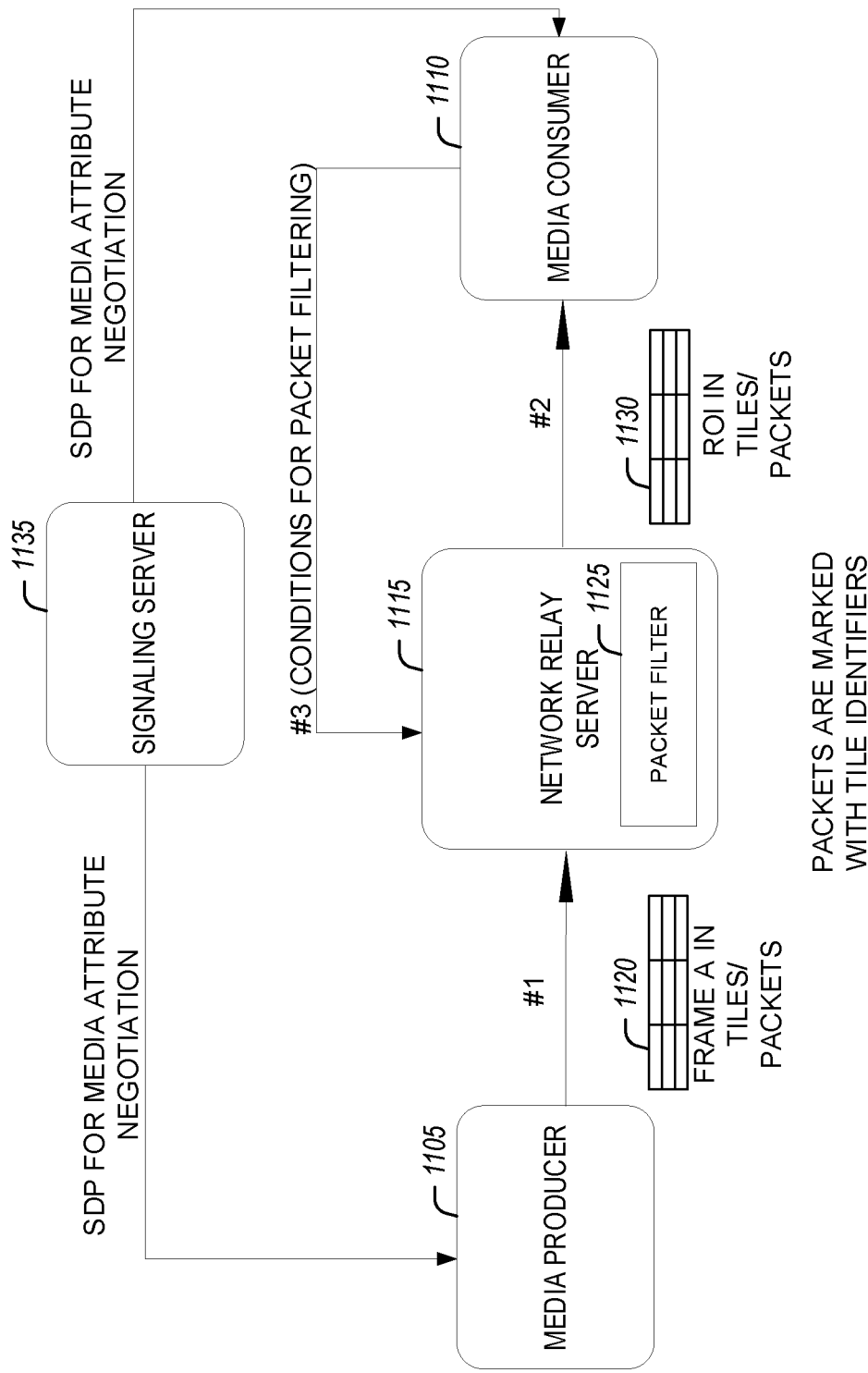
FIG. 11 illustrates a packet-filter based relay server to deliver regions of content.

FIG. 11 illustrates a packet-filter based relay server to deliver regions of content. The example illustrated in FIG. 11 presents a more generic and flexible implementation to those illustrated in FIGS. 9 and 10. In the example of FIG. 11, media attributes are negotiated between a media producer 1105 and a media consumer 1110 via session description protocol (SDP) using a signaling server 1135. In an example, the codec and partition layout information (e.g., columns and/or rows of tiles) may be negotiated by the media producer 1105 and the media consumer 1110 during a session initiation phase. In such an example, network relay servers 1115 do not require media-specific knowledge.

In an example, the content structure (e.g., regions, tiles, or the like) may be reflected in transport protocol headers, or network packets. When the media producer 1105 package encodes regions into transport packets 1120, it may denote region of interest identifiers in the header fields. The media consumer 1110 may then calculate the mapping from its coordinates to the region of interest identifiers based on the application logic and pass the expected region identifiers to the network relay servers 1115. This process is distinguishable from other implementation because other implementations pass the coordinates to the network relay servers 1115 and let the network relay servers 1115 calculate the mapping coordinates to the region of interest identifiers. In the implementation illustrated in FIG. 11, the region of interest identifiers may be composed as simple, generic packet filters 1125 in network relay servers or services. At the same time, the packet filters are as effective as region filters for media content. In such an example the network relay servers 1115 may select packets 1130 based on the expected region of interest identifiers from the media consumer 1110 (from #3 in FIG. 11) and code the region of interest identifiers in incoming packets 1120 (from #1 in FIG. 11).

This implementation resolves the concerns identified above. The implementation of FIG. 11 makes a clear separation between the media entities and the network entities. The packet filter 1125 in the network relay server is generic and scalable. The system may be implemented as an extension of current RTC as a service which supports various XR use cases. Further, the implementation of FIG. 11 may also work with a secured channel such as SRTP (because the SRTP header is not encrypted). The media producer 1105 and the media consumer 1110 may handle media related calculations based on the information they negotiate.

In addition, the RTC service in the network relay servers 1115 may have backward compatibility. As such, the network relay servers 1115 may support traditional full-content transport (as shown in FIG. 8) because it is a case with no particular filter. This implementation may be applied to RTP and other real-time transport protocols.

Figure 12:
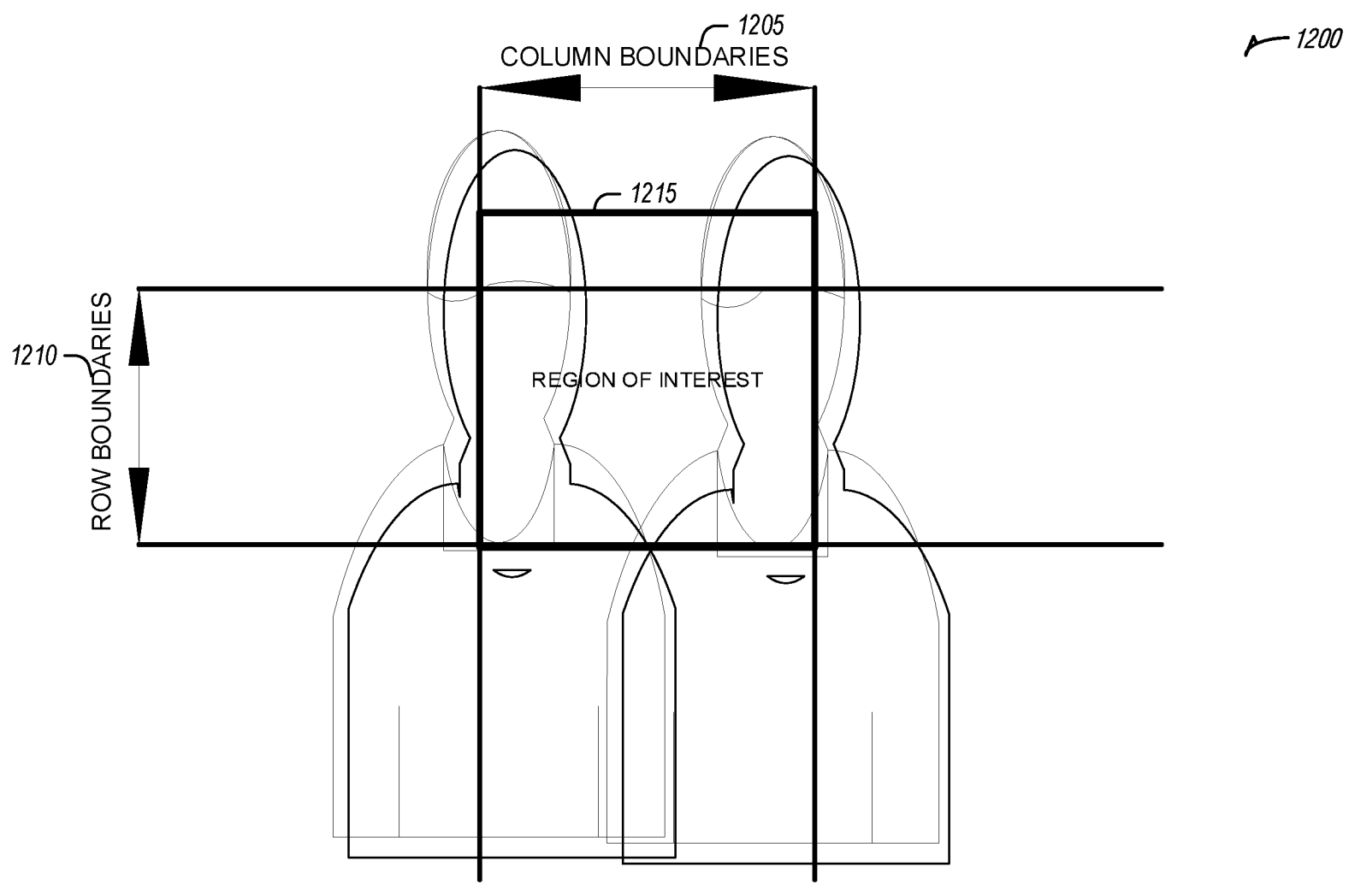

FIG. 12 illustrates an example of content partitioning 1200 of media content. Modern video codecs (e.g., HEVC, AV1, AVI, and VVC) support partitioning a picture into small independent rectangular regions, slices, tiles, or the like that may enable parallel encoding within a picture through assigning each partition to different CPU processing cores. Partition encoding significantly reduces the computation complexity and encoding latency. Such a partition encoding method is widely used in immersive media (VR/AR/MR) for 2.5D (e.g., two dimensional with perception effect providing the appearance or three dimensions) or 3D data. For example, motion picture experts group (MPEG) omnidirectional media application format (OMAF) specified as a viewport-dependent 360 degree video streaming implementation based on tiles that enables network relay servers to transport partial content within a media consumer/user viewport to client devices.

In an example, this media structure/information may be isolated from the network relay servers (or services). The media producer and the media consumer may have awareness of the media content partition structure (e.g., total number of tiles, column numbers, row numbers, or the like) for a region of interest (ROI) 1215 which may be communicated and negotiated through SDP at the beginning of the session. The partition attributes of the media content (a 2D frame or a 3D frame) may be simply described as: 1) number of columns 1205; 2) number of rows 1210; and 3) size of each column 1205 or row 1210. More complex properties of the partition attributes of the media content may also be included.

The three properties may be aligned with those defined in video codecs and are sufficient for a wide range of immersive media applications. In an example, these attributes may be added into SDP communication and negotiation as an extension of the media format in media description. For example, the media information for the image of FIG. 12 may be defined in SDP as shown in Table 1.

TABLE 1 m=video 51372 RTP/AVP 99
a=rtpmap:99 h263-1998/90000
where "a=rtpmap" describes the media codec attributes, without content partition information.

In an example, the specification of content partitions may be an additional attribute line, defined as "a=layout". In an example, the syntax of content partitions may be as shown in Table 2.

TABLE 2 layout-value = payload-type <SP> row <SP> list-of-col-size <SP> list-of-row-size
list-of-col-size = col-size ["/" col-size]
list-of-row-size = row-size ["/" row-size]
where the <SP> refers to a space, and the payload-type is the payload type
in "m=".

In an example, the partition attributes added in SDP according to the 3×3 layout partition in FIG. 12 may be as shown in Table 3.

TABLE 3 m=video 51372 RTP/AVP 99
a=rtpmap:99 h263-1998/90000
a=layout 99 3 3 1280/1280/1280 2560/2560/2560

In Table 3, the third line contains the attributes that denotes the partition information on the image in FIG. 12. The text "3 3" in the a-layout parameter refers to the three columns and three rows, "1280/1280/1280" refers to the size of each of the columns in number of pixels, and "2560/2560/2560" refers to the size of each of the rows in number of pixels. With this information, the media consumer may calculate and request the needed regions directly from the network relay servers. The network relay servers do not have to understand this content partition and may still deliver the appropriate content (packets) as long as the region identifier(s) are embedded in the packet structure.

Figure 13:
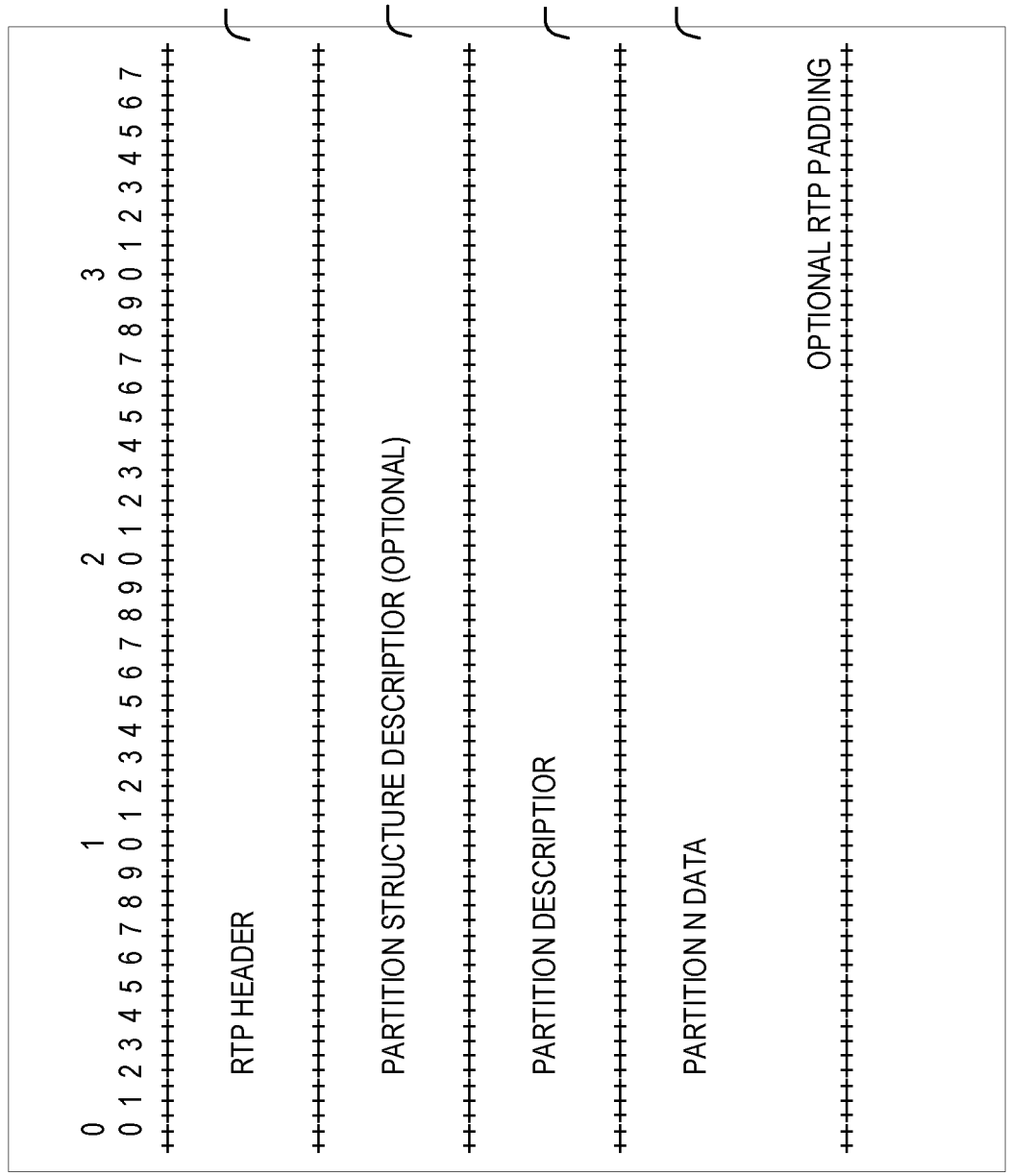
FIG. 13 illustrates an example of a partition based on a real time transport protocol payload format.

FIG. 13 illustrates an example of a partition 1300 based on a real time transport protocol payload format. In an example, content partition information may be added to RTP streams, and the network relay servers may be made capable of selecting appropriate content partition segments based on the content partition structure, without parsing payloads. Thus, an RTP transport packet header 1305 may be extended to carry partition information to enable media tile/slice awareness by the application making use of the transport protocol without the need for additional signaling or compute overhead. An RTP forwarding service on a network server may be codec agnostic and may apply to any picture partition scheme such as slice, tile, or the like. Therefore, a partition-based RTP packet filter which may distribute and route payload content without parsing the payload content may be enabled.

In the partition-based RTP payload format example illustrated in FIG. 13, partition n data 1320 is the payload data of the tile/slice. A partition structure descriptor 1310 describes an offset and resolution of each partition (e.g., each tile/slice) within a picture as well as the priority. A partition descriptor 1315 may describe the partition and is described in more detail in FIG. 15.

Figure 14:
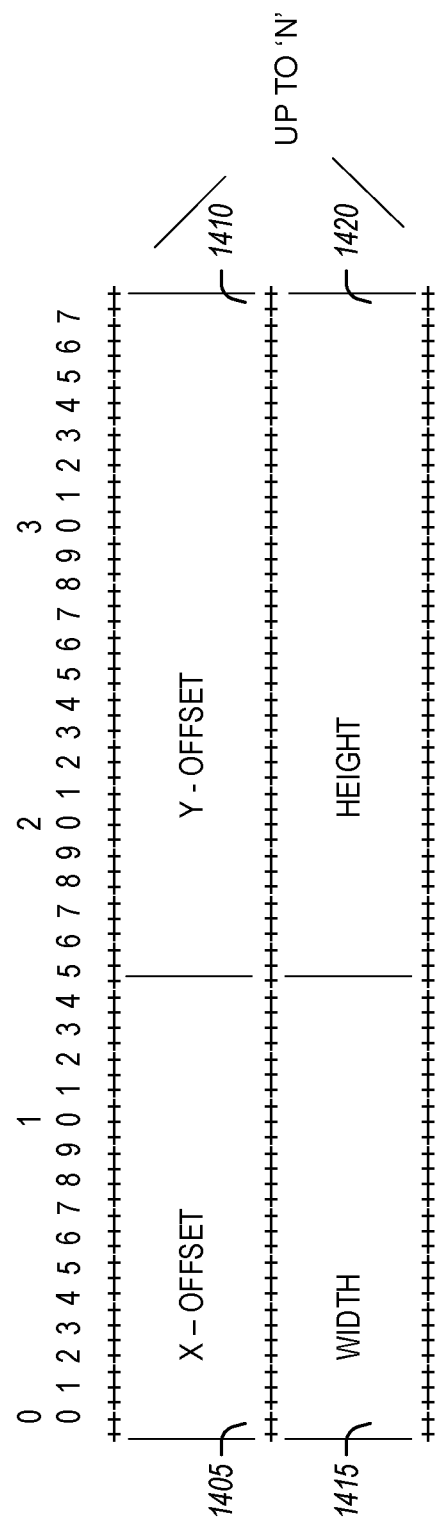
FIG. 14 illustrates an example of a partition structure descriptor within an extended RTP header.

FIG. 14 illustrates an example of a partition structure descriptor 1400 within an extended RTP header. In an example, the partition structure descriptor 1400 may contain information such as a region identifier, a number of partitions, an x-offset 1405, a y-offset 1410, a width 1415 and a height 1420 of a picture or a portion of a picture, as well as information about a priority level.

Figure 15:
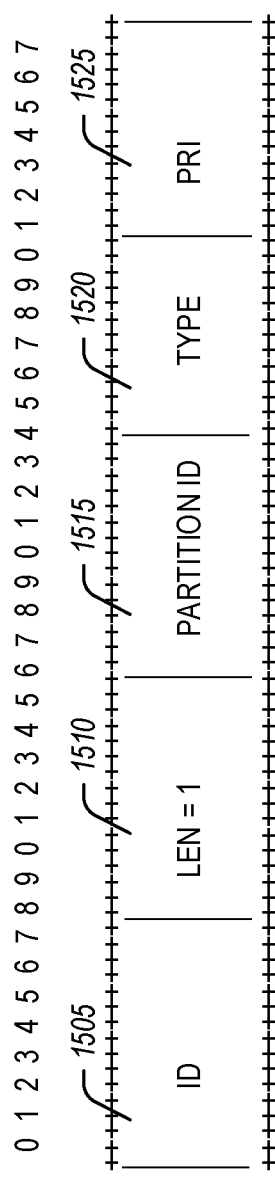
FIG. 15 illustrates an example of a partition descriptor.

FIG. 15 illustrates an example of a partition descriptor 1500. The partition descriptor 1500 may be included in an extended RTP header as illustrated in FIG. 13. In an example, the partition descriptor 1500 may include a partition ID 1515, which may be a unique identifier that identifies a partition within a picture. The partition descriptor 1500 may further include a type 1520, which may be an inter-predicted or intra-predicted partition. The partition descriptor 1500 may also include a region identifier 1505, a length of the partition 1510, and a priority level (PRI) 1525. The PRI 1525 may be a priority level set by an application according to factors such as quality of the partition (e.g., high quality, low quality, or the like, the position in the picture, or the like, etc.). In an example, the PRI 1525 may be used as a hint for RTP relay for different quality of service (QoS) requirements, policies, or the like. In an example, the partition descriptor 1500 may be transported either in-band as session description protocol (SDP) signaling, or out-of-band for each group of pictures. Thus, the partition descriptor 1500 may describe a particular partition sent with each RTP packet.

Figure 16:
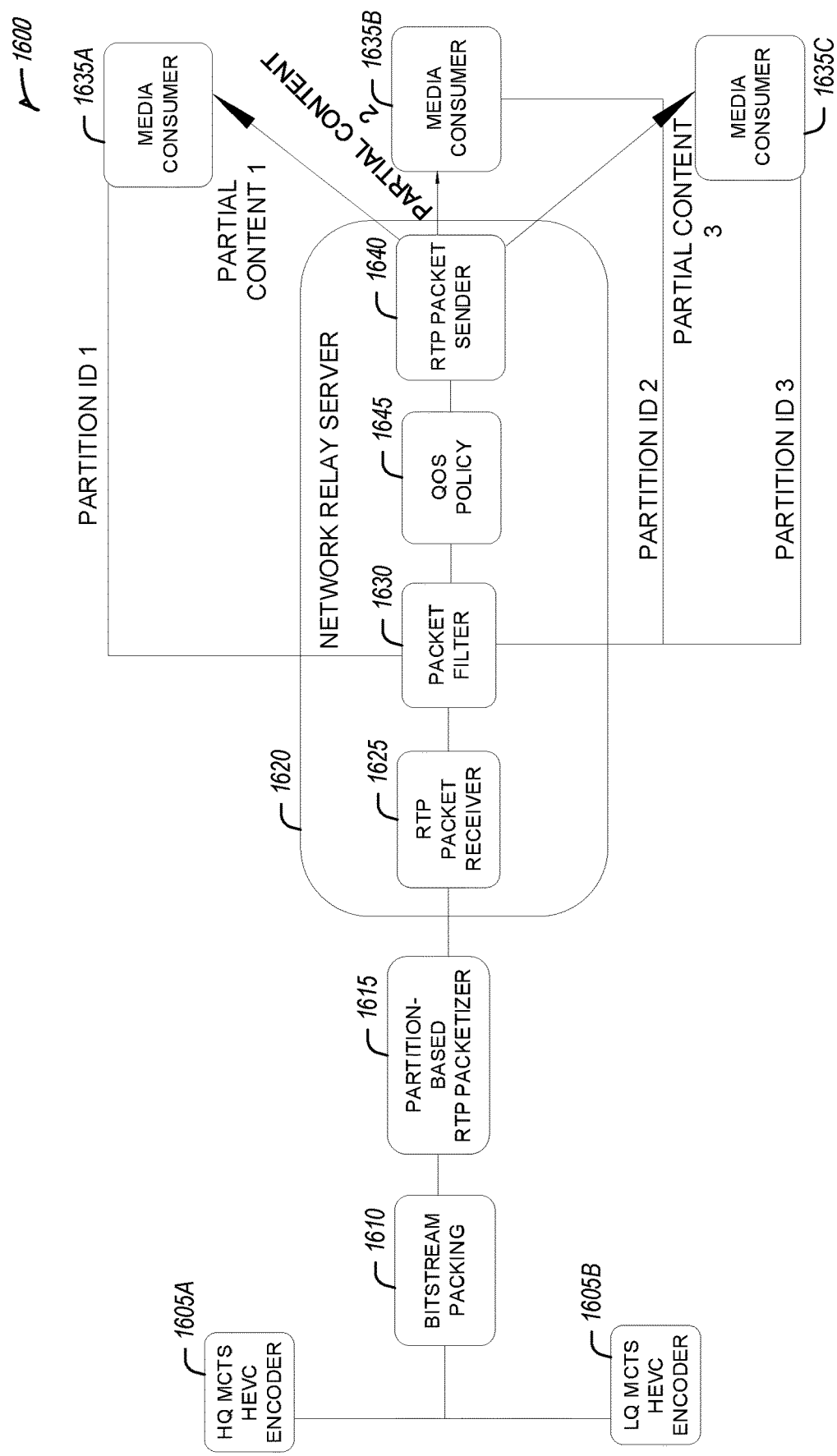
FIG. 16 illustrates an example of a flowchart for end-to-end content partition aware RTP streaming.

FIG. 16 is a data flow diagram of an example of a data flow 1600 for end-to-end content partition aware RTP streaming. In an example, one or more motion constraint tile sets (MCTS) (e.g., high quality MCTS 1605A and low quality MCTS 1605B) may be packaged as a bitstream 1610 and sent to a partition-based RTP packetizer 1615. The partition-based RTP packet may be sent to a network relay server 1620, which may contain an RTP packet receiver 1625 to receive the RTP packet and send the RTP packet to a packet filter 1630. The packet filter 1630 and media consumer/consumers (e.g., media consumer 1635A, media consumer 1635B, and media consumer 1635C) may exchange information such as partition identifiers for each partition. In an example, the partition identifiers exchanged between the media consumers and the packet filter 1630 may compose, generate, create, or the like, a generic filter for each session. Thus, the network relay server 1620 does not have to have knowledge of, or the like, content-specific or media-specific information. In an example, the partition identifiers may describe a region of the media content (e.g., a region of interest, etc.), a segment of the media content (e.g., a subset of frames of a video, etc.), a spatial partition of the media content, a tile of the media content, or a slice of the media content.

The packet filter 1630 may send the filtered RTP packet to a QoS policy server 1645, component, or the like, on the network relay server 1620. The QoS policy server 1645 may determine if the filtered RTP packet meets the requirements of the QoS policy. The filtered RTP packet may then be sent, transmitted or the like, to an RTP packet sender 1640, which may send the partial content to a media consumer. In an example, partial content may be sent to different media consumers (for example, partial content 1 may be sent to a media consumer 1635A, partial content 2 may be sent to media consumer 1635B, and partial content 3 may be sent to media consumer 1635C. Each of the media consumers may be a different media consumer. This allows for the delivery of selective content without parsing payload packets.

Figure 17:
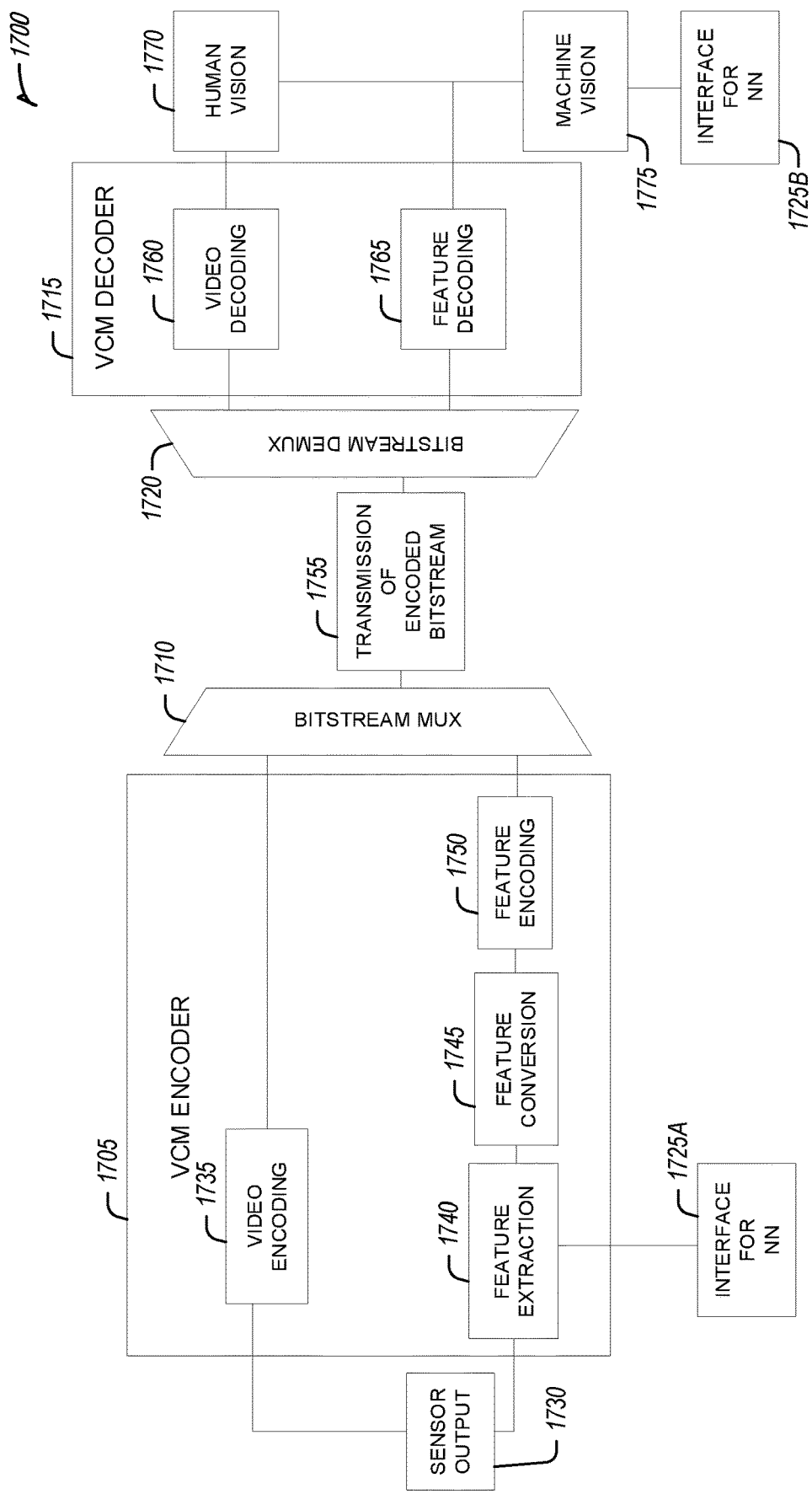
FIG. 17 illustrates an example MPEG video coding.

FIG. 17 illustrates an example of motion picture experts group (MPEG) video coding 1700. In an example, a selective transport for high volume content with certain structure (e.g., partitions in content) may be provided by the present disclosure. This may allow for a selective filter to be applied in a transport layer in order to transport an appropriate, desired, or the like, portion of immersive media content to a media consumer via an interface 1725. The techniques described herein may thus be applied to high-volume contents with mux-ed data streams in one transmission channel (e.g., MPEG video coding for machines (VCM)).

In the example illustrated in FIG. 17, a VCM encoder 1705 may receive the media content data from sensor outputs 1730 or the like. An AI analytics data (the "Feature" in FIG. 17) may be extracted 1740, converted 1745, and/or encoded 1750, then multiplexed or mux-ed 1710 with a video encoding 1735 bitstream 1755. The encoded bitstream 1755 may then be transmitted to a receiver side (a VCM decoder 1715) at which a demux 1720 operation may split the video content into decoded video 1760 and AI features into decoded features 1765. The decoded video 1760 may be used for human vision 1770 and the decoded features may be used for machine vision 1775. The transmission may carry all data streams, although the receiver/decoder may not need all the AI features data. Therefore, when the amount of AI features is greater, the bandwidth of the transmission will increase. Using the content partition based RTC described above, the multiplexer or muxer 1710 may work in conjunction with a selective filter, such as the packet filter 1630 in FIG. 16 and generate the multiplexed transport bitstream 1755 based on a receiver/decoder requests in real-time.

Figure 18:
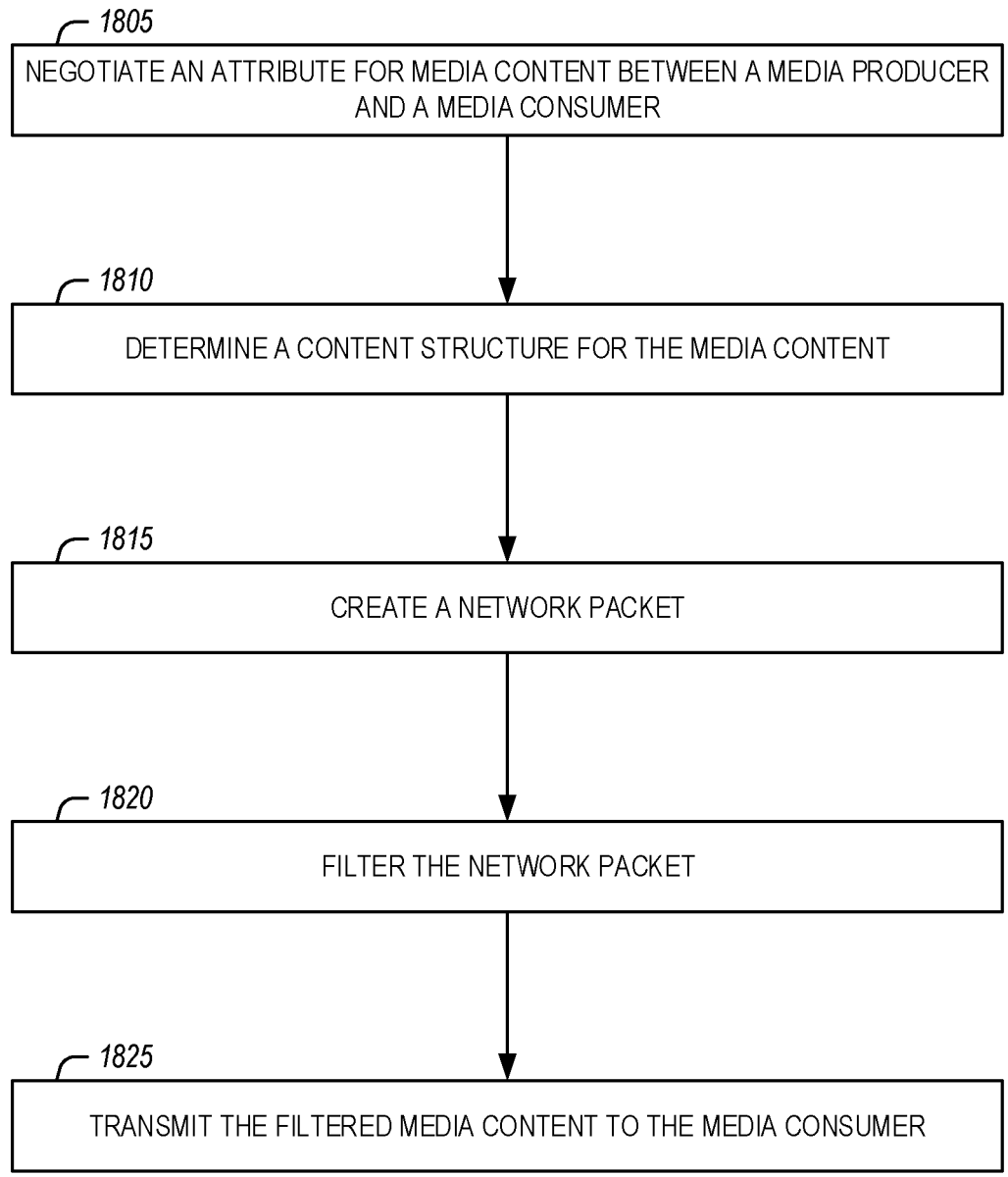
FIG. 18 is a flow diagram of an example of a method for content partition based real time communication for immersive media.

FIG. 18 is a flow diagram of an example of a method 1800 for content partition based real time communication for immersive media, according to an embodiment. The method 1800 may provide features as described in FIGS. 8 to 17.

An attribute may be negotiated for media content between a media producer and a media consumer (e.g., at operation 1805). In an example, a session description protocol (SDP) communication may be initiated between the media producer and the media consumer. A codec may be identified that is compatible with the media producer and the media consumer. A content partition layout may be identified that is compatible with the media producer and the media consumer and the codec and the content partition layout may be transmitted to the media producer and the media consumer via the SDP communication. In an example, the media content may be video content according to a motion picture experts group (MPEG) format. A content structure may be determined for the media content based on the negotiation (e.g., at operation 1810). In an example, the content structure may include regions of the media content or tiles that represent the regions of the media content. In an example, spatially partitioned immersive media content is three-dimensional video content, virtual reality content, augmented reality content, or perception enhanced two-dimensional video content.

A network packet may be created (e.g., at operation 1815), the network packet may include information corresponding to the determined content structure encoded into a transport protocol header of the network packet. In an example, the transport protocol header may include identifiers for the regions of the media content or the tiles that represent the regions of the media content. In another example, the transport protocol header may include a partition descriptor. The partition descriptor may include a partition identifier, a type for a partition of the media content, and a priority level for the partition. In yet another example, the transport protocol header may include a partition structure descriptor. The partition structure descriptor may include a first axis offset, a second axis offset, a width, and a height for partitions of the media content.

In an example, the network packet may be transmitted to a network relay server. In an example, the network packet may be a real-time transport protocol (RTP) packet. In an example, features may be extracted from the media content based on the content structure and the features may be encoded for inclusion in the network packet. In an example, the network relay server may be a server device, a virtual network function, a microservice, or a software component executing on an edge node in communication with an edge computing network.

The network packet may be filtered using partition identifiers received from the media consumer to produce filtered media content (e.g., at operation 1820). In an example, the partition identifiers may describe a region of the media content (e.g., a region of interest, etc.), a segment of the media content (e.g., a subset of frames of a video, etc.), a spatial partition of the media content, a tile of the media content, or a slice of the media content. In an example, a partition of the media content may be selected using the attribute and the content structure. A media fragment may be retrieved for a portion of the media content associated with the partition and the filtered media content may include the media fragment for the portion of the media content. In an example, partition identifiers exchanged between the media consumer and a packet filter may compose, generate, create, or the like, a generic filter for each session. Thus, the network relay server does not have to have knowledge of, or the like, content-specific or media-specific information.

The filtered media content may be transmitted to the media consumer (e.g., at operation 1825). In an example, encoded video content and the encoded features of the filtered media content may be multiplexed into an encoded bitstream and the encoded bitstream may be transmitted to the media consumer. In an example, the encoded features may define video elements used for interpretation of the media content using machine vision.

ADDITIONAL NOTES & EXAMPLES

Example 1 is a system for selective transport of spatially partitioned immersive media content comprising: at least one processor; and memory including instructions that, when executed by the at least one processor, cause the at least one processor to perform operations to: negotiate, via a signaling service, an attribute for media content between a media producer and a media consumer; determine, based on the negotiating, a content structure for the media content; create a network packet, the network packet including information corresponding to the determined content structure that is encoded into a transport protocol header of the network packet; filter the network packet using partition identifiers received from the media consumer to produce filtered media content; and transmit the filtered media content to the media consumer.

In Example 2, the subject matter of Example 1 includes subject matter wherein, the partition identifiers may describe a region of the media content, a segment of the media content, a spatial partition of the media content, a tile of the media content, or a slice of the media content.

In Example 3, the subject matter of Examples 1-2 includes subject matter wherein, the instructions to negotiate the attribute for the media content between the media producer and the media consumer further comprises instructions that, when executed by the at least one processor, cause the at least one processor to perform operations to: initiate a session description protocol (SDP) communication session between the media producer and the media consumer via the signaling service; identify a codec that is compatible with the media producer and the media consumer; identify a content partition layout that is compatible with the media producer and the media consumer; and transmit information for the codec and the content partition layout to the media producer and the media consumer via the SDP communication session.

In Example 4, the subject matter of Examples 1-3 includes subject matter wherein, the content structure includes regions of the media content or tiles that represent the regions of the media content.

In Example 5, the subject matter of Example 4 includes subject matter wherein, the transport protocol header includes identifiers for the regions of the media content or the tiles that represent the regions of the media content.

In Example 6, the subject matter of Examples 1-5 includes subject matter wherein, the network packet is a real-time transport protocol (RTP) packet.

In Example 7, the subject matter of Examples 1-6 includes subject matter wherein, the transport protocol header includes a partition descriptor, the partition descriptor including a partition identifier, a type for a partition of the media content, and a priority level for the partition.

In Example 8, the subject matter of Examples 1-7 includes subject matter wherein, the transport protocol header includes a partition structure descriptor, the partition structure descriptor including a first axis offset, a second axis offset, a width, and a height of a partition of the media content.

In Example 9, the subject matter of Examples 1-8 includes, the memory further comprising instructions that, when executed by the at least one processor, cause the at least one processor to perform operations to: extract features from the media content based on the content structure; and encode the features for inclusion in the network packet.

In Example 10, the subject matter of Example 9 includes subject matter wherein, the instructions to transmit the filtered media content to the media consumer further comprises instructions that, when executed by the at least one processor, cause the at least one processor to perform operations to: multiplex encoded video content and the encoded features of the filter media content into an encoded bitstream; and transmit the encoded bitstream to the media consumer.

In Example 11, the subject matter of Example 10 includes subject matter wherein, the encoded features are used for automated interpretation of the media content by a computing device.

In Example 12, the subject matter of Examples 1-11 includes subject matter wherein, the instruction to filter the network packet to produce the filtered media content further comprises instructions that, when executed by the at least one processor, cause the at least one processor to perform operations to: select a partition of the media content using the attribute and the content structure; and retrieve a media fragment for a portion of the media content associated with the partition, wherein the filtered media content includes the media fragment for the portion of the media content.

In Example 13, the subject matter of Examples 1-12 includes subject matter wherein, the packet is filtered by a network relay server that is provided by a server device, a virtual network function, a microservice, or a software component executing on an edge node in communication with an edge computing network.

In Example 14, the subject matter of Examples 1-13 includes subject matter wherein, the media content is video content according to a motion picture experts group (MPEG) format.

In Example 15, the subject matter of Examples 1-14 includes subject matter wherein, the spatially partitioned immersive media content is three-dimensional video content, virtual reality content, augmented reality content, or perception enhanced two-dimensional video content.

Example 16 is at least one non-transitory machine-readable medium including instructions for selective transport of spatially partitioned immersive media content that, when executed by at least one processor, cause the at least one processor to perform operations to: negotiate, via a signaling service, an attribute for media content between a media producer and a media consumer; determine, based on the negotiating, a content structure for the media content; create a network packet, the network packet including information corresponding to the determined content structure that is encoded into a transport protocol header of the network packet; filter the network packet using partition identifiers received from the media consumer to produce filtered media content; and transmit the filtered media content to the media consumer.

In Example 17, the subject matter of Example 16 includes subject matter wherein, the partition identifiers may describe a region of the media content, a segment of the media content, a spatial partition of the media content, a tile of the media content, or a slice of the media content.

In Example 18, the subject matter of Examples 16-17 includes subject matter wherein, the instructions to negotiate the attribute for the media content between the media producer and the media consumer further comprises instructions that, when executed by the at least one processor, cause the at least one processor to perform operations to: initiate a session description protocol (SDP) communication session between the media producer and the media consumer via the signaling service; identify a codec that is compatible with the media producer and the media consumer; identify a content partition layout that is compatible with the media producer and the media consumer; and transmit information for the codec and the content partition layout to the media producer and the media consumer via the SDP communication session.

In Example 19, the subject matter of Examples 16-18 includes subject matter wherein, the content structure includes regions of the media content or tiles that represent the regions of the media content.

In Example 20, the subject matter of Example 19 includes subject matter wherein, the transport protocol header includes identifiers for the regions of the media content or the tiles that represent the regions of the media content.

In Example 21, the subject matter of Examples 16-20 includes subject matter wherein, the network packet is a real-time transport protocol (RTP) packet.

In Example 22, the subject matter of Examples 16-21 includes subject matter wherein, the transport protocol header includes a partition descriptor, the partition descriptor including a partition identifier, a type for a partition of the media content, and a priority level for the partition.

In Example 23, the subject matter of Examples 16-22 includes subject matter wherein, the transport protocol header includes a partition structure descriptor, the partition structure descriptor including a first axis offset, a second axis offset, a width, and a height of a partition of the media content.

In Example 24, the subject matter of Examples 16-23 includes, instructions that, when executed by the at least one processor, cause the at least one processor to perform operations to: extract features from the media content based on the content structure; and encode the features for inclusion in the network packet.

In Example 25, the subject matter of Example 24 includes subject matter wherein, the instructions to transmit the filtered media content to the media consumer further comprises instructions that, when executed by the at least one processor, cause the at least one processor to perform operations to: multiplex encoded video content and the encoded features of the filter media content into an encoded bitstream; and transmit the encoded bitstream to the media consumer.

In Example 26, the subject matter of Example 25 includes subject matter wherein, the encoded features are used for automated interpretation of the media content by a computing device.

In Example 27, the subject matter of Examples 16-26 includes subject matter wherein, the instruction to filter the network packet to produce the filtered media content further comprises instructions that, when executed by the at least one processor, cause the at least one processor to perform operations to: select a partition of the media content using the attribute and the content structure; and retrieve a media fragment for a portion of the media content associated with the partition, wherein the filtered media content includes the media fragment for the portion of the media content.

In Example 28, the subject matter of Examples 16-27 includes subject matter wherein, the packet is filtered by a network relay server that is provided by a server device, a virtual network function, a microservice, or a software component executing on an edge node in communication with an edge computing network.

In Example 29, the subject matter of Examples 16-28 includes subject matter wherein, the media content is video content according to a motion picture experts group (MPEG) format.

In Example 30, the subject matter of Examples 16-29 includes subject matter wherein, the spatially partitioned immersive media content is three-dimensional video content, virtual reality content, augmented reality content, or perception enhanced two-dimensional video content.

Example 31 is a method for selective transport of spatially partitioned immersive media content comprising: negotiating, via a signaling service, an attribute for media content between a media producer and a media consumer; determining, based on the negotiating, a content structure for the media content; creating a network packet, the network packet including information corresponding to the determined content structure that is encoded into a transport protocol header of the network packet; filtering the network packet using partition identifiers received from the media consumer to produce filtered media content; and transmitting the filtered media content to the media consumer.

In Example 32, the subject matter of Example 31 includes subject matter wherein, the partition identifiers may describe a region of the media content, a segment of the media content, a spatial partition of the media content, a tile of the media content, or a slice of the media content.

In Example 33, the subject matter of Examples 31-32 includes subject matter wherein, negotiating the attribute for the media content between the media producer and the media consumer further comprises: initiating a session description protocol (SDP) communication session between the media producer and the media consumer via the signaling service; identifying a codec that is compatible with the media producer and the media consumer; identifying a content partition layout that is compatible with the media producer and the media consumer; and transmitting information for the codec and the content partition layout to the media producer and the media consumer via the SDP communication session.

In Example 34, the subject matter of Examples 31-33 includes subject matter wherein, the content structure includes regions of the media content or tiles that represent the regions of the media content.

In Example 35, the subject matter of Example 34 includes subject matter wherein, the transport protocol header includes identifiers for the regions of the media content or the tiles that represent the regions of the media content.

In Example 36, the subject matter of Examples 31-35 includes subject matter wherein, the network packet is a real-time transport protocol (RTP) packet.

In Example 37, the subject matter of Examples 31-36 includes subject matter wherein, the transport protocol header includes a partition descriptor, the partition descriptor including a partition identifier, a type for a partition of the media content, and a priority level for the partition.

In Example 38, the subject matter of Examples 31-37 includes subject matter wherein, the transport protocol header includes a partition structure descriptor, the partition structure descriptor including a first axis offset, a second axis offset, a width, and a height of a partition of the media content.

In Example 39, the subject matter of Examples 31-38 includes, extracting features from the media content based on the content structure; and encoding the features for inclusion in the network packet.

In Example 40, the subject matter of Example 39 includes subject matter wherein, transmitting the filtered media content to the media consumer further comprises: multiplexing encoded video content and the encoded features of the filter media content into an encoded bitstream; and transmitting the encoded bitstream to the media consumer.

In Example 41, the subject matter of Example 40 includes subject matter wherein, the encoded features are used for automated interpretation of the media content by a computing device.

In Example 42, the subject matter of Examples 31-41 includes subject matter wherein, filtering the network packet to produce the filtered media content further comprises: selecting a partition of the media content using the attribute and the content structure; and retrieving a media fragment for a portion of the media content associated with the partition, wherein the filtered media content includes the media fragment for the portion of the media content.

In Example 43, the subject matter of Examples 31-42 includes subject matter wherein, the packet is filtered by a network relay server that is provided by a server device, a virtual network function, a microservice, or a software component executing on an edge node in communication with an edge computing network.

In Example 44, the subject matter of Examples 31-43 includes subject matter wherein, the media content is video content according to a motion picture experts group (MPEG) format.

In Example 45, the subject matter of Examples 31-44 includes subject matter wherein, the spatially partitioned immersive media content is three-dimensional video content, virtual reality content, augmented reality content, or perception enhanced two-dimensional video content.

Example 46 is at least one machine-readable medium including instructions that, when executed by a machine, cause the machine to perform any method of Examples 31-45.

Example 47 is a system comprising means to perform any method of Examples 31-45.

Example 48 is a system for selective transport of spatially partitioned immersive media content comprising: means for negotiating, via a signaling service, an attribute for media content between a media producer and a media consumer; means for determining, based on the negotiating, a content structure for the media content; means for creating a network packet, the network packet including information corresponding to the determined content structure that is encoded into a transport protocol header of the network packet; means for filtering the network packet using partition identifiers received from the media consumer to produce filtered media content; and means for transmitting the filtered media content to the media consumer.

In Example 49, the subject matter of Example 48 includes subject matter wherein, the partition identifiers may describe a region of the media content, a segment of the media content, a spatial partition of the media content, a tile of the media content, or a slice of the media content.

In Example 50, the subject matter of Examples 48-49 includes subject matter wherein, the means for negotiating the attribute for the media content between the media producer and the media consumer further comprises: means for initiating a session description protocol (SDP) communication session between the media producer and the media consumer via the signaling service; means for identifying a codec that is compatible with the media producer and the media consumer; means for identifying a content partition layout that is compatible with the media producer and the media consumer; and means for transmitting information for the codec and the content partition layout to the media producer and the media consumer via the SDP communication session.

In Example 51, the subject matter of Examples 48-50 includes subject matter wherein, the content structure includes regions of the media content or tiles that represent the regions of the media content.

In Example 52, the subject matter of Example 51 includes subject matter wherein, the transport protocol header includes identifiers for the regions of the media content or the tiles that represent the regions of the media content.

In Example 53, the subject matter of Examples 48-52 includes subject matter wherein, the network packet is a real-time transport protocol (RTP) packet.

In Example 54, the subject matter of Examples 48-53 includes subject matter wherein, the transport protocol header includes a partition descriptor, the partition descriptor including a partition identifier, a type for a partition of the media content, and a priority level for the partition.

In Example 55, the subject matter of Examples 48-54 includes subject matter wherein, the transport protocol header includes a partition structure descriptor, the partition structure descriptor including a first axis offset, a second axis offset, a width, and a height of a partition of the media content.

In Example 56, the subject matter of Examples 48-55 includes, means for extracting features from the media content based on the content structure; and means for encoding the features for inclusion in the network packet.

In Example 57, the subject matter of Example 56 includes subject matter wherein, the means for transmitting the filtered media content to the media consumer further comprises: means for multiplexing encoded video content and the encoded features of the filter media content into an encoded bitstream; and means for transmitting the encoded bitstream to the media consumer.

In Example 58, the subject matter of Example 57 includes subject matter wherein, the encoded features are used for automated interpretation of the media content by a computing device.

In Example 59, the subject matter of Examples 48-58 includes subject matter wherein, the means for filtering the network packet to produce the filtered media content further comprises: means for selecting a partition of the media content using the attribute and the content structure; and means for retrieving a media fragment for a portion of the media content associated with the partition, wherein the filtered media content includes the media fragment for the portion of the media content.

In Example 60, the subject matter of Examples 48-59 includes subject matter wherein, the packet is filtered by a network relay server that is provided by a server device, a virtual network function, a microservice, or a software component executing on an edge node in communication with an edge computing network.

In Example 61, the subject matter of Examples 48-60 includes subject matter wherein, the media content is video content according to a motion picture experts group (MPEG) format.

In Example 62, the subject matter of Examples 48-61 includes subject matter wherein, the spatially partitioned immersive media content is three-dimensional video content, virtual reality content, augmented reality content, or perception enhanced two-dimensional video content.

Example 63 is at least one machine-readable medium including instructions that, when executed by processing circuitry, cause the processing circuitry to perform operations to implement of any of Examples 1-62.

Example 64 is an apparatus comprising means to implement of any of Examples 1-62.

Example 65 is a system to implement of any of Examples 1-62.

Example 66 is a method to implement of any of Examples 1-62.

Example 67 is at least one machine-readable medium including instructions, which when executed by a machine, cause the machine to perform operations of any of the operations of Examples 1-62.

Example 68 is an apparatus comprising means for performing any of the operations of Examples 1-62.

Example 69 is a system to perform the operations of any of the Examples 1-62.

Example 70 is a method to perform the operations of any of the Examples 1-62.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. A system for selective transport of spatially partitioned immersive media content comprising:
   at least one processor; and
   memory including instructions that, when executed by the at least one processor, cause the at least one processor to perform operations to:
   negotiate, via a signaling service, an attribute for media content between a media producer and a media consumer;
   determine, based on the negotiating, a content structure for the media content;
   create a network packet, the network packet including information corresponding to the determined content structure that is encoded into a transport protocol header of the network packet;
   filter the network packet using partition identifiers received from the media consumer to produce filtered media content; and
   transmit the filtered media content to the media consumer.

2. The system of claim 1, wherein the partition identifiers may describe a region of the media content, a segment of the media content, a spatial partition of the media content, a tile of the media content, or a slice of the media content.

3. The system of claim 1, wherein the instructions to negotiate the attribute for the media content between the media producer and the media consumer further comprises instructions that, when executed by the at least one processor, cause the at least one processor to perform operations to:
   initiate a session description protocol (SDP) communication session between the media producer and the media consumer via the signaling service;
   identify a codec that is compatible with the media producer and the media consumer;
   identify a content partition layout that is compatible with the media producer and the media consumer; and
   transmit information for the codec and the content partition layout to the media producer and the media consumer via the SDP communication session.

4. The system of claim 1, wherein the content structure includes regions of the media content or tiles that represent the regions of the media content.

5. The system of claim 4, wherein the transport protocol header includes identifiers for the regions of the media content or the tiles that represent the regions of the media content.

6. The system of claim 1, wherein the network packet is a real-time transport protocol (RTP) packet.

7. The system of claim 1, wherein the transport protocol header includes a partition descriptor, the partition descriptor including a partition identifier, a type for a partition of the media content, and a priority level for the partition.

8. The system of claim 1, wherein the transport protocol header includes a partition structure descriptor, the partition structure descriptor including a first axis offset, a second axis offset, a width, and a height of a partition of the media content.

9. The system of claim 1, the memory further comprising instructions that, when executed by the at least one processor, cause the at least one processor to perform operations to:
- extract features from the media content based on the content structure; and
- encode the features for inclusion in the network packet.

10. The system of claim 9, wherein the instructions to transmit the filtered media content to the media consumer further comprises instructions that, when executed by the at least one processor, cause the at least one processor to perform operations to:
- multiplex encoded video content and the encoded features of the filter media content into an encoded bitstream; and
- transmit the encoded bitstream to the media consumer.

11. The system of claim 10, wherein the encoded features are used for automated interpretation of the media content by a computing device.

12. The system of claim 1, wherein the instruction to filter the network packet to produce the filtered media content further comprises instructions that, when executed by the at least one processor, cause the at least one processor to perform operations to:
- select a partition of the media content using the attribute and the content structure; and
- retrieve a media fragment for a portion of the media content associated with the partition, wherein the filtered media content includes the media fragment for the portion of the media content.

13. The system of claim 1, wherein the packet is filtered by a network relay server that is provided by a server device, a virtual network function, a microservice, or a software component executing on an edge node in communication with an edge computing network.

14. The system of claim 1, wherein the media content is video content according to a motion picture experts group (MPEG) format.

15. The system of claim 1, wherein the spatially partitioned immersive media content is three-dimensional video content, virtual reality content, augmented reality content, or perception enhanced two-dimensional video content.

16. At least one non-transitory machine-readable medium including instructions for selective transport of spatially partitioned immersive media content that, when executed by at least one processor, cause the at least one processor to perform operations to:
- negotiate, via a signaling service, an attribute for media content between a media producer and a media consumer;
- determine, based on the negotiating, a content structure for the media content;
- create a network packet, the network packet including information corresponding to the determined content structure that is encoded into a transport protocol header of the network packet;
- filter the network packet using partition identifiers received from the media consumer to produce filtered media content; and
- transmit the filtered media content to the media consumer.

17. The at least one non-transitory machine-readable medium of claim 16, wherein the instructions to negotiate the attribute for the media content between the media producer and the media consumer further comprises instructions that, when executed by the at least one processor, cause the at least one processor to perform operations to:
- initiate a session description protocol (SDP) communication session between the media producer and the media consumer via the signaling service;
- identify a codec that is compatible with the media producer and the media consumer;
- identify a content partition layout that is compatible with the media producer and the media consumer; and
- transmit information for the codec and the content partition layout to the media producer and the media consumer via the SDP communication session.

18. The at least one non-transitory machine-readable medium of claim 16, further comprising instructions that, when executed by the at least one processor, cause the at least one processor to perform operations to:
- extract features from the media content based on the content structure; and
- encode the features for inclusion in the network packet.

19. A method for selective transport of spatially partitioned immersive media content comprising:
- negotiating, via a signaling service, an attribute for media content between a media producer and a media consumer;
- determining, based on the negotiating, a content structure for the media content;
- creating a network packet, the network packet including information corresponding to the determined content structure that is encoded into a transport protocol header of the network packet;
- filtering the network packet using partition identifiers received from the media consumer to produce filtered media content; and
- transmitting the filtered media content to the media consumer.

20. The method of claim 19, wherein negotiating the attribute for the media content between the media producer and the media consumer further comprises:
- initiating a session description protocol (SDP) communication session between the media producer and the media consumer via the signaling service;
- identifying a codec that is compatible with the media producer and the media consumer;
- identifying a content partition layout that is compatible with the media producer and the media consumer; and
- transmitting information for the codec and the content partition layout to the media producer and the media consumer via the SDP communication session.

* * * * *